US008373818B2

(12) United States Patent
Tomizawa et al.

(10) Patent No.: US 8,373,818 B2
(45) Date of Patent: Feb. 12, 2013

(54) MULTIPLE-PRIMARY-COLOR DISPLAY DEVICE

(75) Inventors: Kazunari Tomizawa, Osaka (JP); Yuichi Yoshida, Osaka (JP); Akiko Sato, Osaka (JP)

(73) Assignee: Sharp Kabushiki Kaihsa, Osaka (JP)

( * ) Notice: Subject to any disclaimer, the term of this patent is extended or adjusted under 35 U.S.C. 154(b) by 0 days.

(21) Appl. No.: 13/511,195

(22) PCT Filed: Nov. 22, 2010

(86) PCT No.: PCT/JP2010/070822

§ 371 (c)(1), (2), (4) Date: May 22, 2012

(87) PCT Pub. No.: WO2011/065332

PCT Pub. Date: Jun. 3, 2011

(65) Prior Publication Data

US 2012/0229529 A1 Sep. 13, 2012

(30) Foreign Application Priority Data

Nov. 26, 2009 (JP) ................................ 2009-269319

(51) Int. Cl.
*G02F 1/1335* (2006.01)

(52) U.S. Cl. ............. 349/61; 349/56; 349/84; 349/139; 349/144

(58) Field of Classification Search .................... 349/56, 349/61, 84, 139, 144
See application file for complete search history.

(56) References Cited

U.S. PATENT DOCUMENTS 4,800,375 A 1/1989 Silverstein et al.
7,542,110 B2 * 6/2009 Maeda et al. ................. 349/106
(Continued)

FOREIGN PATENT DOCUMENTS

JP 9-251160 A 9/1997
JP 2001-209047 A 8/2001
(Continued)

OTHER PUBLICATIONS

English translation of Official Communication issued in corresponding International Application PCT/JP2010/070822, mailed on Jul. 19, 2012.
Official Communication issued in International Patent Application No. PCT/JP2010/070822, mailed on Dec. 21, 2010.

(Continued)

*Primary Examiner* — Jennifer Doan
(74) *Attorney, Agent, or Firm* — Keating & Bennett, LLP

(57) ABSTRACT

A multiple primary color display device according to the present invention includes a pixel defined by a plurality of sub pixels. The plurality of sub pixels include a first sub pixel to display a first color having a first hue, a second sub pixel to display a second color having a second hue, a third sub pixel to display a third color having a third hue, and a fourth sub pixel to display a fourth color having a fourth hue. When a color represented by the input signal is changed from black to white via a color of a prescribed hue, luminance levels of the plurality of sub pixels are set such that the luminance level of each of the first sub pixel, the second sub pixel and the third sub pixel is started to be increased without increasing the luminance level of the fourth sub pixel and such that the luminance level of the third sub pixel is increased at a lower rate than that of the luminance level of each of the first sub pixel and the second sub pixel.

8 Claims, 13 Drawing Sheets

U.S. PATENT DOCUMENTS

| | | | | |
|---|---|---|---|---|
| 7,760,297 | B2 * | 7/2010 | Takizawa | 349/114 |
| 8,228,275 | B2 * | 7/2012 | Langendijk | 345/88 |
| 2003/0151694 | A1 | 8/2003 | Lee et al. | |
| 2004/0174389 | A1 | 9/2004 | Ben-David et al. | |
| 2005/0122294 | A1 | 6/2005 | Ben-David et al. | |
| 2009/0135213 | A1 | 5/2009 | Tomizawa et al. | |
| 2009/0167657 | A1 | 7/2009 | Tomizawa | |

FOREIGN PATENT DOCUMENTS

| | | | |
|---|---|---|---|
| JP | 2001-306023 | A | 11/2001 |
| JP | 2003-295812 | A | 10/2003 |
| JP | 2004-529396 | A | 9/2004 |
| WO | 2007/032133 | A1 | 3/2007 |
| WO | 2007/097080 | A1 | 8/2007 |

OTHER PUBLICATIONS

Yang et al.; "31.1: Development of Six Primary-Color LCD"; Society For Information Display, 2005 International Symposium Digest of Technical Papers; vol. XXXVI, Book II; May 25-27, 2005; pp. 1210-1213.

Chino et al.; "25.1: Invited Paper: Development of Wide-Color-Gamut Mobile Displays With Four-Primary-Color LCDs"; Society For Information Display, 2006 International Symposium Digest of Technical Papers; vol. XXXVII, Book II; Jun. 7-9, 2006; pp. 1221-1224.

Ben-Chorin; "Improving LCD TV Color Using Multi-Primary Technology"; FPD International 2005 Forum; Oct. 19, 2005; Total of 66 pages.

* cited by examiner (a)

(b)

MULTIPLE-PRIMARY-COLOR DISPLAY DEVICE

TECHNICAL FIELD

The present invention relates to a multiple primary color display device.

BACKGROUND ART

Color display devices such as color TVs, color monitors and the like usually represent colors by additive color mixing of RGB primary colors (i.e., red, green and blue). Pixels in a general color display device each include red, green and blue sub pixels in correspondence with the RGB primary colors. By setting the luminance of each of the red, green and blue sub pixels to a desired value, various colors are represented.

The luminance of each sub pixel varies in the range from a minimum gray scale level (e.g., gray scale level 0) to a maximum gray scale level (e.g., gray scale level 255). Herein, for the sake of convenience, the luminance (luminance level) of a sub pixel at the minimum gray scale level is represented as "0", and the luminance (luminance level) of a sub pixel at the maximum gray scale level is represented as "1". The luminance (luminance level) of a sub pixel is controlled in the range from "0" to "1".

When all the sub pixels, namely, the red, green and blue sub pixels have a luminance of "0", the color displayed by the pixel is black. By contrast, when all the sub pixels have a luminance of "1", the color displayed by the pixel is white. Many of TV sets available today allow users to adjust the color temperature. In such a case, the color temperature is adjusted by fine-tuning the luminance of each sub pixel. Thus, herein the luminance of a sub pixel after the color temperature is adjusted to a desired level is represented as "1".

Aside from the above-described display devices using three primary colors, display devices which represent colors by additive color mixing of four or more primary colors have been proposed. Such a display device is referred to as a "multiple primary color display device". In a multiple primary color display device, the three RGB colors and another color(s) are used. Thus, display can be provided with a wide color reproduction range (see, for example, Patent Documents 1 and 2).

Patent Document 1 discloses a multiple primary color display device in which each of pixels has four or more sub pixels. Patent Document 2 discloses a multiple primary color display device in which each of pixels has red, green, blue, yellow and cyan sub pixels.

With reference to FIG. 26, how the luminance of each sub pixel in the multiple primary color display device disclosed in Patent Document 2 is changed will be described. FIG. 26(*a*) is a color tone diagram showing a color reproduction range of a pixel in the multiple primary color display device described in Patent Document 2. FIG. 26(*b*) shows a change of the color displayed by the pixel. FIG. 26(*c*) shows a change of the luminance of each of the yellow, red, green, cyan and blue sub pixels. In this example, the luminance of each sub pixel is changed such that the color displayed by the pixel is changed from black to white via yellow having an approximately equal hue to the hue of the yellow sub pixel.

In an initial state, the color displayed by the pixel is black, and all the sub pixels have a luminance of Then, the luminance of the yellow sub pixel is increased to "1". After reaching "1", the luminance of the yellow sub pixel is kept at "1".

Next, the luminance of each of the red and green sub pixels is started to be increased. The luminances of the red and green sub pixels are increased to "1" at an equal rate. In this example, the luminances of the red and green sub pixels are increased to "1" at an equal rate, so that the lightness of the pixel is increased without changing the hue. When the luminance of each of the red and green sub pixels reaches "1", the color displayed by the pixel shows the maximum chroma at this hue, and such a color is referred to also as an "optimal color". After reaching "1", the luminance of each of the red and green sub pixels is kept at "1".

Then, in order to further increase the lightness of the pixel, the luminance of each of the cyan and blue sub pixels is started to be increased. In this example, the luminance of each of the cyan and blue sub pixels is increased while the luminance of each of the red and green sub pixels is kept at "1", so that the lightness of the pixel is increased without changing the hue. When the luminances of all the sub pixels become "1", the color displayed by the pixel is white. In this manner, for changing the lightness with the hue of the yellow sub pixel, the multiple primary color display device described in Patent Document 2 starts increasing the luminances of the sub pixels sequentially, namely, from the luminances of the sub pixels having hues closer to the hue of the yellow sub pixel. As a result, the color reproduction range can be expanded.

CITATION LIST

Patent Literature

Patent Document 1: Japanese National-Phase PCT Laid-Open Publication No. 2004-529396

Patent Document 2: International Publication WO2007/032133

SUMMARY OF INVENTION

Technical Problem

The hue of a color represented by a multiple primary color display device is occasionally significantly different from the hue of a color represented by an input signal. In this case, the display quality is decreased.

The present invention made in light of the above-described problem has an object of providing a multiple primary color display device which displays a color having a hue which is suppressed from being shifted from the hue represented by an input signal.

Solution to Problem

A multiple primary color display device according to the present invention includes a pixel defined by a plurality of sub pixels. The plurality of sub pixels include a first sub pixel to display a first color having a first hue, a second sub pixel to display a second color having a second hue, a third sub pixel to display a third color having a third hue, and a fourth sub pixel to display a fourth color having a fourth hue. In the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues of the plurality of sub pixels, the second hue is closest to the prescribed hue on an opposite side to the first hue with respect to the prescribed hue, and the third hue is closest to the prescribed hue next to the first hue on the same side as the first hue with respect to the prescribed hue; luminance levels of the plurality of sub pixels are set such that the luminance level of each of the first sub pixel, the second sub pixel and the third sub pixel is started to be increased without increasing the luminance level of the fourth sub pixel and such that the luminance level of the third sub pixel is increased at a lower rate than that of the luminance level of each of the first sub pixel and the second sub pixel.

In one embodiment, when the color represented by the input signal is changed from black to white via the color of the prescribed hue, the luminance levels of the plurality of sub pixels are set such that after the luminance level of each of the first sub pixel and the second sub pixel reaches a maximum luminance level, the luminance level of the fourth sub pixel is started to be increased.

A multiple primary color display device according to the present invention includes a pixel defined by a plurality of sub pixels. The plurality of sub pixels include a first sub pixel to display a first color having a first hue, a second sub pixel to display a second color having a second hue, a third sub pixel to display a third color having a third hue, and a fourth sub pixel to display a fourth color having a fourth hue. In the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues of the plurality of sub pixels, and the second hue is closest to the prescribed hue on an opposite side to the first hue with respect to the prescribed hue; luminance levels of the plurality of sub pixels are set such that the luminance level of each of the first sub pixel and the second sub pixel is started to be increased without increasing the luminance level of each of the third sub pixel and the fourth sub pixel and such that the luminance level of the second sub pixel is increased at a lower rate than that of the luminance level of the first sub pixel.

In one embodiment, when the color represented by the input signal is changed from black to white via the color of the prescribed hue, the luminance levels of the plurality of sub pixels are set such that after the luminance level of the first sub pixel reaches a maximum luminance level, the luminance level of the third sub pixel is started to be increased.

In one embodiment, when the color represented by the input signal is changed from black to white via the color of the prescribed hue, the luminance levels of the plurality of sub pixels are set such that after the luminance level of the second sub pixel reaches a maximum luminance level, the luminance level of the fourth sub pixel is started to be increased.

In one embodiment, each of the first, second, third and fourth colors are any of red, green, blue and yellow; and when the first color is yellow, the second and third colors are red and green.

A multiple primary color display device according to the present invention includes a pixel. The pixel is capable of displaying a first color having a first hue, a second color having a second hue, a third color having a third hue, and a fourth color having a fourth hue at any luminance with any combination. In the case where gray scale levels of two colors among three colors of red, green and blue of an input signal are increased to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues displayable by the pixel, the second hue is closest to the prescribed hue on an opposite side to the first hue with respect to the prescribed hue, and the third hue is closest to the prescribed hue next to the first hue on the same side as the first hue with respect to the prescribed hue; luminance levels of the colors displayable by the pixel are set such that the luminance level of each of the first color, the second color and the third color is started to be increased without increasing the luminance level of the fourth color and such that the luminance level of the third color is increased at a lower rate than that of the luminance level of each of the first color and the second color.

A multiple primary color display device according to the present invention includes a pixel. The pixel is capable of displaying a first color having a first hue, a second color having a second hue, a third color having a third hue, and a fourth color having a fourth hue at any luminance with any combination. In the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues displayable by the pixel, and the second hue is closest to the prescribed hue on an opposite side to the first hue with respect to the prescribed hue; luminance levels of the colors displayable by the pixel are set such that the luminance level of each of the first color and the second color is started to be increased without increasing the luminance level of each of the third color and the fourth color and such that the luminance level of the second color is increased at a lower rate than that of the luminance level of the first color.

Advantageous Effects of Invention

According to a multiple primary color display device of the present invention, the hue of a color can be suppressed from being shifted from the hue of the color represented by an input signal.

BRIEF DESCRIPTION OF DRAWINGS

FIG. 1(*b*) is a schematic view of a multiple primary color panel in the multiple primary color display device shown in FIG. 1(*a*).

FIG. 2(*b*) is a chromaticity diagram of the L*a*b* colorimetric system.

FIG. 5(*b*) shows a change of a luminance level of each of yellow, red, green and blue sub pixels included in the multiple primary color display device in Embodiment 1.

FIG. 7(*b*) shows a change of a luminance level of each of yellow, red, green and blue sub pixels included in the multiple primary color display device in Comparative Example 1.

FIG. 16(*b*) shows a change of a luminance level of each of yellow, red, green and blue sub pixels included in a multiple primary color display device in Embodiment 2 according to the present invention.

FIG. 18(*b*) shows a change of a luminance level of each of yellow, green, red and blue sub pixels included in the multiple primary color display device in Comparative Example 2.

FIG. 26(*b*) shows a change of a color displayed by the pixel; and FIG. 26(*c*) shows a change of a luminance level of each of yellow, red, green, cyan and blue sub pixels.

DESCRIPTION OF EMBODIMENTS

Hereinafter, with reference to the figures, multiple primary color display devices in embodiments according to the present invention will be described. The present invention is not limited to the following embodiments.

Embodiment 1

Hereinafter, a multiple primary color display device in Embodiment 1 according to the present invention will be described.

Figure 1:
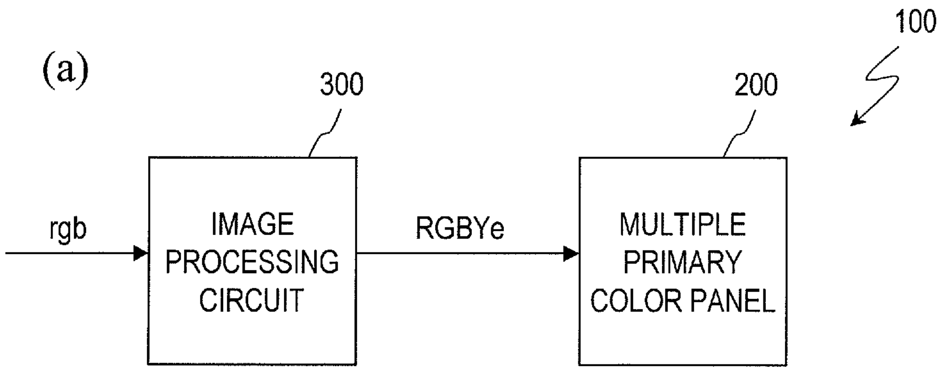
FIG. 1(*a*) is a schematic block diagram showing a multiple primary color display device in Embodiment according to the present invention.
Figure 1:
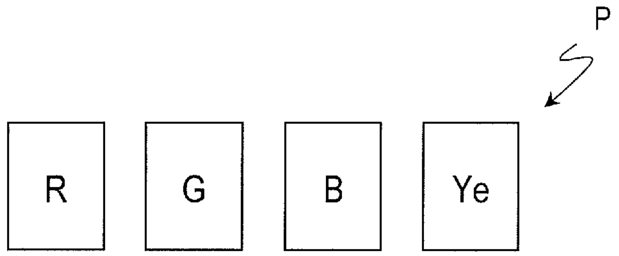

FIG. 1(*a*) is a schematic block diagram of a multiple primary color display device 100 in this embodiment. The multiple primary color display device 100 includes a multiple primary color panel 200 and an image processing circuit 300. In the following description, a multiple primary color display device may be referred to simply as a "display device". The multiple primary color display device 100 includes a plurality of pixels. Each of the pixels is defined by a plurality of sub pixels.

FIG. 1(*b*) shows a pixel P provided in the multiple primary panel 200 and an arrangement of sub pixels included in the pixel P. FIG. 1(*b*) shows one pixel P as an example. Each pixel P includes four sub pixels, specifically, a red sub pixel R, a green sub pixel G, a blue sub pixel B, and a yellow sub pixel Ye.

In the following description, the hue of a color displayed by only the red sub pixel may be represented as "hue (R)" or simply as "(R)". Similarly, the hue of a color displayed by only the green sub pixel may be represented as "hue (G)" or simply as "(G)". The hue of a color displayed by only the blue sub pixel may be represented as "hue (B)" or simply as "(B)". The hue of a color displayed by only the yellow sub pixel may be represented as "hue (Ye)" or simply as "(Ye)".

The multiple primary color panel 200 is, for example, a liquid crystal panel. In this case, the display device 100 is referred to as a "liquid crystal display device". The liquid crystal panel may include a backlight device. The four sub pixels included in one pixel are realized by, for example, forming four different sub pixel areas per pixel in a color filter (not shown) included in the multiple primary color panel 200.

The image processing circuit 300 shown in FIG. 1(*a*) generates a multiple primary color signal based on an input signal. The multiple primary color panel 200 provides display based on the multiple primary color signal. The image processing circuit 300 is mounted on, for example, the multiple primary color panel 200.

The input signal represents red, green and blue gray scale levels r, g and b, and the gray scale levels r, g and b are generally expressed by 8 bits. Alternatively, the input signal has a value which can be converted into the red, green and blue gray scale levels r, g and b, and this value is represented three-dimensionally. The input signal may be, for example, a YCrCb signal. In FIG. 1(*a*), the gray scale levels r, g and b are collectively represented as "rgb".

The input signal is in conformity to a prescribed standard. For example, the input signal is in conformity to Rec. 709 (BT. 709). In this case, the gray scale levels r, g and b represented by the input signal are each in the range from a minimum gray scale level (e.g., gray scale level 0) to a maximum gray scale level (e.g., gray scale level 255). Alternatively, the input signal may be in conformity to the EBU Standard. When the input signal represents black, the gray scale levels r, g and b are each the minimum gray scale level (e.g., gray scale level 0). When the input signal represents white, the gray scale levels r, g and b are each the maximum gray scale level (e.g., gray scale level 255).

The multiple primary color signal generated by the image processing circuit 300 represents the gray scale levels of the sub pixels in the multiple primary color panel 200. In FIG. 1(*a*), the gray scale levels of the red sub pixel, the green sub pixel, the blue sub pixel and the yellow sub pixel are collectively represented as "RGBYe". The sub pixels in the multiple primary color panel 200 respectively show luminances corresponding to the gray scale levels of the multiple primary color signal.

In the display device 100, the luminance of each sub pixel varies in the range from a minimum luminance corresponding to a minimum gray scale level (e.g., gray scale level 0) to a maximum luminance corresponding to a maximum gray scale level (e.g., gray scale level 255). In the following description, for the sake of convenience, the luminance level of the sub pixel corresponding to a minimum gray scale level (e.g., gray scale level 0) will be represented as "0", and the luminance level of the sub pixel corresponding to a maximum gray scale level (e.g., gray scale level 255) will be represented as "1". The luminance level of each of the red, green, blue and yellow sub pixels is controlled in the range from "0" to "1". When all the sub pixels, namely, the red, green, blue and yellow sub pixels have a luminance level of "0", the color displayed by the pixel is black. By contrast, when all the sub pixels, namely, the red, green, blue and yellow sub pixels have a luminance level of "1", the color displayed by the pixel is white. Even when the sub pixels have an equal gray scale level or luminance level, the red, green, blue and yellow sub pixels actually have different luminances. The "luminance level" of each sub pixel represents the luminance ratio with respect to the maximum luminance of the respective sub pixel. In this manner, the luminance level shows a value of the luminance of each sub pixel normalized with the maximum luminance thereof, and is referred to also as the "normalized luminance". In the following description, in the case where the luminance level of a sub pixel in the multiple primary color panel corresponds to the minimum luminance level, such a sub pixel will be expressed also as being "non-lit", and in the case where the luminance level of a sub pixel corresponds to a luminance level which is higher than the minimum luminance level, such a sub pixel will be expressed also as being "lit".

Table 1 shows chromaticities x and y and Y value in the case where either one of the red, green, blue and yellow sub pixels is lit at the maximum luminance level in the display device 100.

TABLE 1

| | x | y | Y |
|---|---|---|---|
| Red sub pixel | 0.644 | 0.339 | 0.123 |
| Green sub pixel | 0.268 | 0.644 | 0.337 |
| Blue sub pixel | 0.144 | 0.053 | 0.126 |
| Yellow sub pixel | 0.392 | 0.567 | 0.413 |

Figure 2:
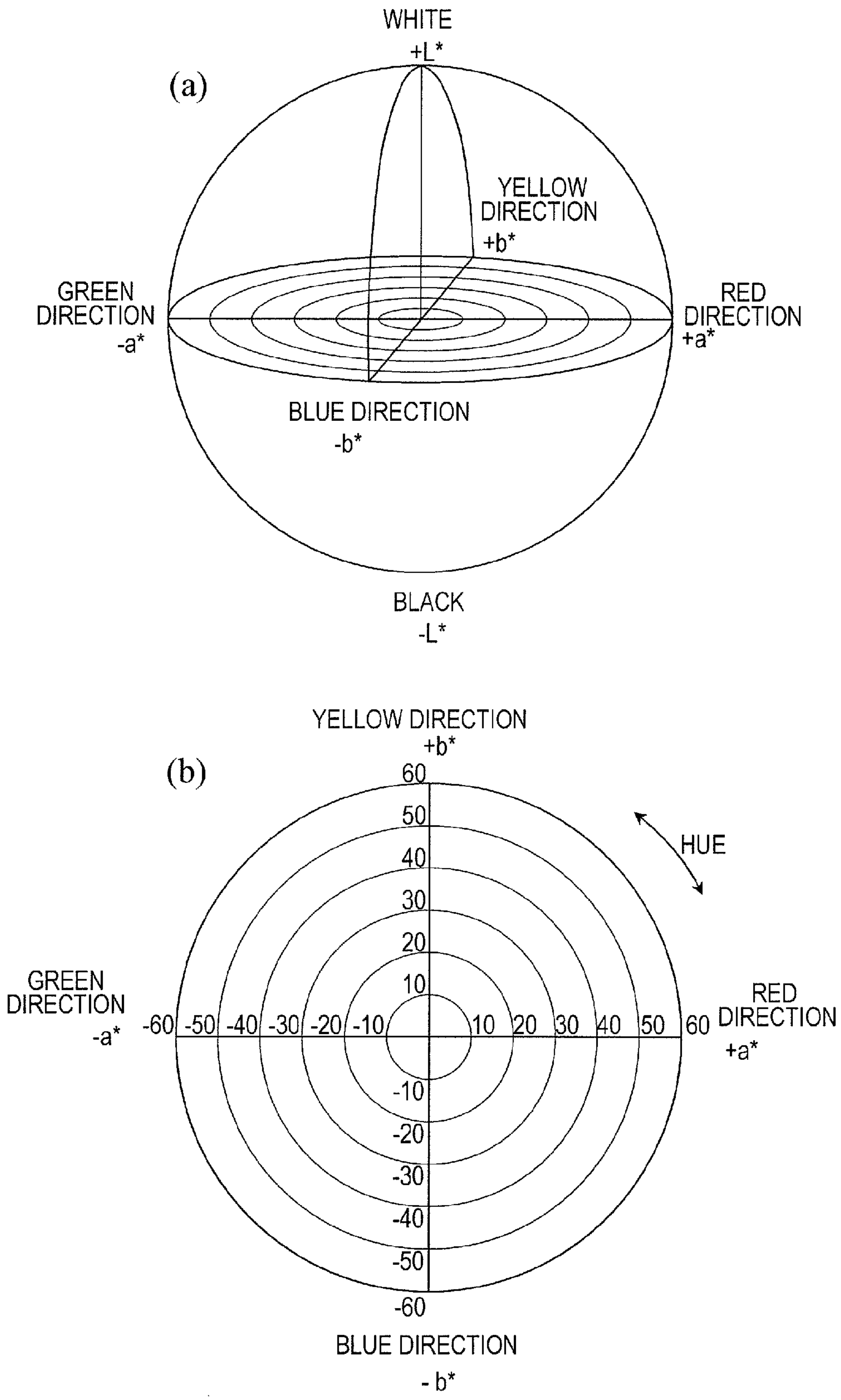
FIG. 2(*a*) is a schematic view showing a three-dimensional image of a color space of an L*a*b* colorimetric system.

FIG. 2(*a*) is a schematic view showing a three-dimensional image of a color space of an L*a*b* colorimetric system. In FIG. 2(*a*), the lightness is represented by L*, and the hue and the chroma are specified by chromaticities a* and b*. Specifically, $C^*=\sqrt{((a^*)^2+(b^*)^2)}$. The chroma is represented by C*, and the hue is represented by the hue angle $\tan^{-1}(b^*/a^*)$. As shown in FIG. 2(*a*), the lightness is increased (the color becomes closer to white) as progressing in the +L direction, whereas the lightness is decreased (the color becomes closer to black) as progressing in the −L direction.

FIG. 2(*b*) is a chromaticity diagram of the L*a*b* colorimetric system. The chromaticity diagram shown in FIG. 2(*b*) corresponds to a cross-sectional view of the schematic view of FIG. 2(*a*) taken along a horizontal direction thereof. As shown in FIG. 2(*a*) and FIG. 2(*b*), the +a* direction represents a red direction, the −a* direction represents a green direction, the +b* direction represents a yellow direction, and the −b* direction represents a blue direction. As the absolute values of the chromaticities a* and b* are larger, the chroma is higher (the color is more vivid); whereas as the absolute values of the chromaticities a* and b* are smaller, the chroma is lower (the color is duller).

Figure 3:
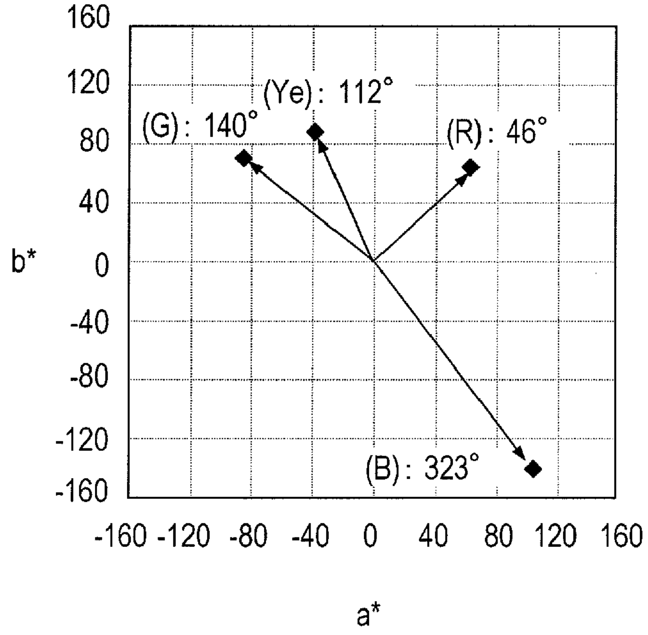
FIG. 3 is a chromaticity diagram of the L*a*b* colorimetric system obtained by plotting a* and b* of four sub pixels in the multiple primary color display device in Embodiment 1.

FIG. 3 is a chromaticity diagram of the L*a*b* colorimetric system obtained by plotting a* and b* of four sub pixels in the display device 100 in this embodiment. FIG. 3 shows the hue angles of a color which is displayed when the luminance level of one sub pixel is maximum and the luminance levels of the other sub pixels are minimum. The hue angle is an angle measured in a counterclockwise direction from 0°, which is the axis of the a* direction (red direction). The hue angle of the hue (R) of the red sub pixel is 46°, the hue angle of the hue (Ye) of the yellow sub pixel is 112°, the hue angle of the hue (G) of the green sub pixel is 140°, and the hue angle of the hue (B) of the blue sub pixel is 323°.

a* and b* of such four sub pixels are determined in accordance with the multiple primary color panel 200. In the case where, for example, the multiple primary color panel 200 is a liquid crystal panel, a* and b* are set based on the characteristics of the color filter and the backlight device.

Figure 4:
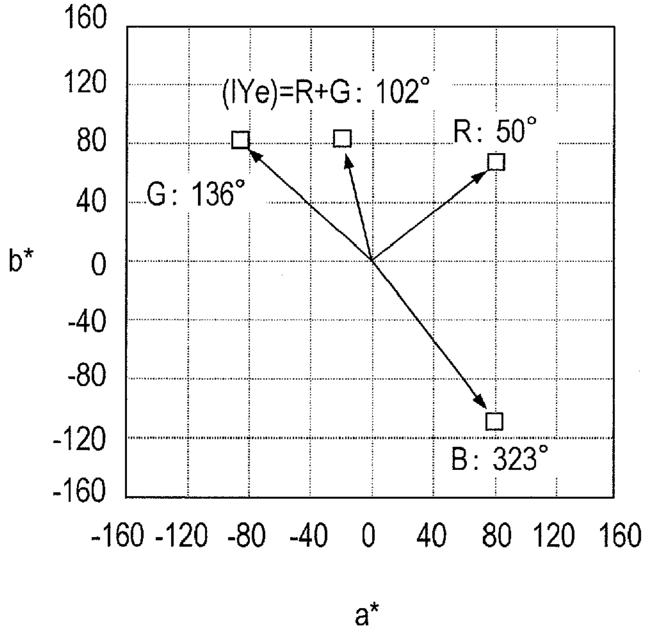
FIG. 4 is a chromaticity diagram of the L*a*b* colorimetric system obtained by plotting a* and b* of a three primary color display device when an input signal represents red, green, blue or yellow.

FIG. 4 is a chromaticity diagram of the L*a*b* colorimetric system obtained by plotting a* and b* of a three primary color display device when an input signal represents red, green, blue or yellow.

When the input signal shows gray scale levels of red, green and blue of (255, 0, 0), the hue angle of the hue of red displayed by the three primary color display device is 50°. When the input signal shows gray scale levels of red, green and blue of (0, 255, 0), the hue angle of the hue of green displayed by the three primary color display device is 136°. When the input signal shows gray scale levels of red, green and blue of (0, 0, 255), the hue angle of the hue of blue displayed by the three primary color display device is 323°. When the input signal shows gray scale levels of red, green and blue of (255, 255, 0), the hue angle of the hue of yellow displayed by the three primary color display device is 102°. In this example, the input signal and the three primary color display device are in conformity to Rec. 709.

In the following description, it is assumed that the gray scale levels of red and green represented by the input signal are increased at an equal rate to each other to the maximum gray scale level and then the gray scale level of blue is increased to the maximum gray scale level, so that the color is changed from black to white via yellow. The hue of this yellow is represented as "hue (IYe)". In the case where, for example, the input signal is in conformity to Rec. 709, the hue angle of the hue (IYe) is 102°. As is understood from comparison between FIG. 3 and FIG. 4, the hue (IYe) is different from any of the hues of the red, green, blue and yellow sub pixels in the display device 100, i.e., (R), (G), (B) and (Ye).

Now, with reference to FIG. 3 and FIG. 4, the closeness between hues and positions thereof will be discussed. The closeness between hues is represented by the difference between hue angles. When the difference between hue angles of a hue and another hue is small, these two hues are close to each other. By contrast, when the difference between hue angles of a hue and another hue is large, these two hues are far from each other.

Regarding the closeness of the hue of each sub pixel in the display device 100 to the hue (IYe) of yellow of the input signal, the hue closest to the hue (IYe) is the hue (Ye) of the yellow sub pixel. The hue angle difference between the hue (IYe) and the hue (Ye) is 10°. In this example, the hue (Ye) of the yellow sub pixel is in the counterclockwise direction from the hue (IYe) of yellow of the input signal.

In the chromaticity diagram of the L*a*b* colorimetric system, the hue (IYe) closest to the hue of yellow of the input signal on the opposite side to the hue (Ye) of the yellow sub pixel (in this example, the opposite side is in the clockwise direction) with respect to the hue (IYe) of yellow of the input signal is the hue (R) of the red sub pixel. The hue angle difference between the hue (IYe) and the hue (R) is 56°. The hue (IYe) of yellow of the input signal is between the hue (Ye) of the yellow sub pixel and the hue (R) of the red sub pixel in the display device 100.

In the chromaticity diagram of the L*a*b* colorimetric system, the hue closest to the hue (IYe) of yellow of the input signal next to the hue (Ye) of the yellow sub pixel on the same side as the hue (Ye) of the yellow sub pixel (in this example, the same side is in the counterclockwise direction) with respect to the hue (IYe) of yellow of the input signal is the hue (G) of the green sub pixel. The hue angle difference between the hue (IYe) and the hue (G) is 38°.

In this example, the closeness of the hue of each sub pixel in the display device 100 to the hue (IYe) of yellow of the input signal and the positions of the hues have been discussed with reference to the chromaticity diagram of the L*a*b* colorimetric system. Alternatively, the hue (IYe) of yellow of the input signal, and the hues of the sub pixels in the display device 100 may be represented on a hue circle, so that the positions of the hue (IYe) of yellow of the input signal and the hues of the sub pixels in the display device 100 are discussed.

Figure 5:
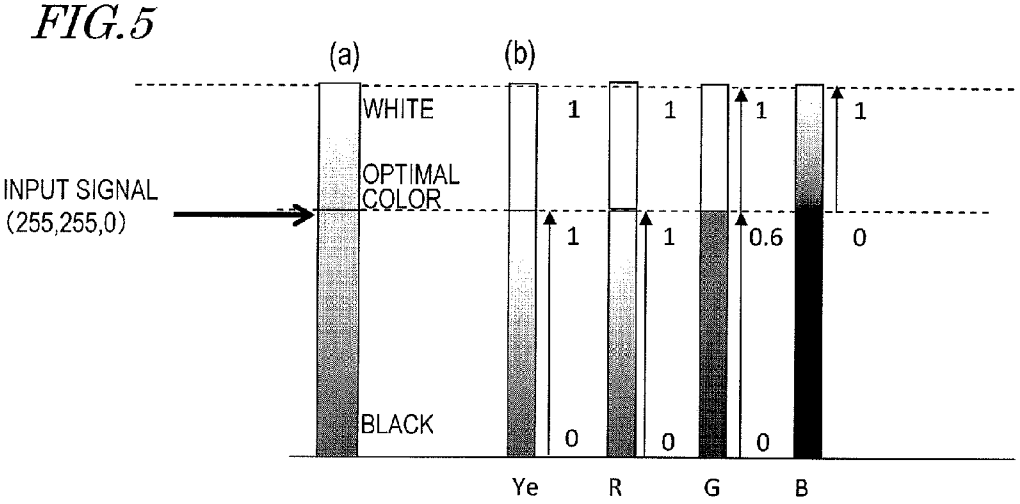
FIG. 5(*a*) shows a change of a color represented by the input signal.

Now, with reference to FIG. 5, the relationship between the change of the color represented by the input signal and the change of the luminance level of each sub pixel included in the display device 100 in this embodiment will be described. FIG. 5(*a*) shows a change of the color represented by the input signal, and FIG. 5(*b*) shows a change of the luminance level of each of the yellow, red, green and blue sub pixels included in the display device 100.

In an initial state, the color represented by the input signal is black. At this point, all the sub pixels included in the display device 100, namely, the yellow, red, green and blue sub pixels have a luminance level of "0". When the color represented by the input signal is started to be changed from black to yellow, the luminance level of each of the yellow, red and green sub pixels is started to be increased without increasing the luminance level of the blue sub pixel in the display device 100 in this embodiment. On this stage, the luminance level of the green sub pixel is increased at a lower rate than that of the luminance level of each of the yellow and red sub pixels. As a result of the luminance level of each of the yellow, red and green sub pixels being increased, the chroma and the lightness of the color displayed by the pixel are increased.

When the color represented by the input signal becomes the optimal color at this hue, the luminance level of each of the yellow and red sub pixels reaches "1" in the display device 100. At this point, the luminance level of the green sub pixel is lower than "1". For example, the luminance level of the green sub pixel is "0.6", which corresponds to gray scale level 202 in the 255 gray scale representation.

Then, when the color represented by the input signal is started to be changed from yellow to white, the luminance level of the green sub pixel is further increased and the luminance level of the blue sub pixel is started to be increased while the luminance level of each of the yellow and red sub pixels is kept at "1" in the display device 100. When the color represented by the input signal becomes white, all the sub pixels have a luminance level of "1" in the display device 100 in this embodiment. In this manner, when the color represented by the input signal is changed from black to white via yellow as shown in FIG. 5(*a*), the luminance level of each of the sub pixels included in the display device 100 in this embodiment is changed as shown in FIG. 5(*b*).

Ideally, the luminance level of the green sub pixel is started to be increased at the same time as the luminance level of each of the yellow and red sub pixels. However, as described above, the rate of increase of the luminance level of each of the yellow and red sub pixels is higher than the rate of increase of the green sub pixel. Therefore, in actuality, as a result of, for example, the quantization of numerical figures of the circuit embodying the above-described control, the luminance level of each of the yellow and red sub pixels may occasionally be started to be increased first, followed by the increase of the luminance level of the green sub pixel.

Hereinafter, advantages of the display device 100 in this embodiment will be described as compared with a display device 400A in Comparative Example 1. First, with reference to FIG. 6 through FIG. 10, the display device 400A in Comparative Example 1 will be described. In the display device 400A in Comparative Example 1 also, each of pixels includes red, green, blue and yellow sub pixels.

Figure 6:
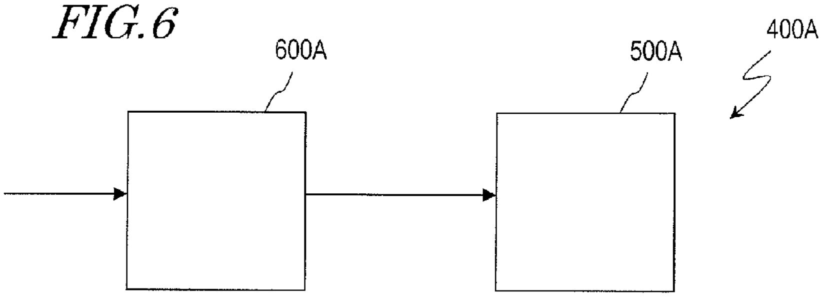
FIG. 6 is a schematic block diagram showing a multiple primary color display device in Comparative Example 1.

FIG. 6 is a schematic block diagram of the display device 400A in Comparative Example 1. The display device 400A includes a multiple primary color panel 500A and an image processing circuit 600A. The multiple primary color panel 500A in the display device 400A in Comparative Example 1 has substantially the same structure as that of the multiple primary color panel 200 in the display device 100 in this embodiment. However, the image processing circuit 600A in the display device 400A in Comparative Example 1 is different from the image processing circuit 300 in the display device 100 in this embodiment in terms of conversion into a multiple primary color signal based on an input signal.

Figure 7:
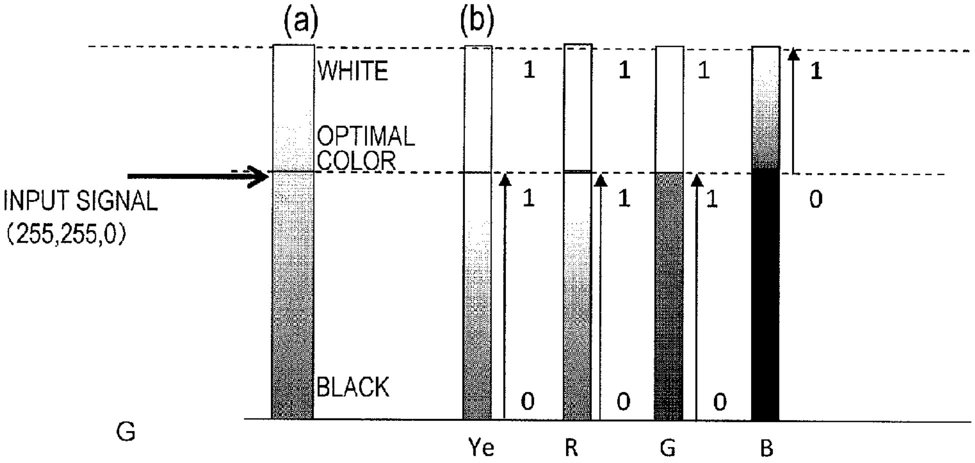
FIG. 7(*a*) shows a change of a color represented by the input signal.

Now, with reference to FIG. 7, the relationship between the change of the color represented by the input signal and the change of the luminance level of each sub pixel included in the display device 400A in Comparative Example 1 will be described. FIG. 7(*a*) shows a change of the color represented by the input signal, and FIG. 7(*b*) shows a change of the luminance level of each of the yellow, red, green and blue sub pixels included in the display device 400A.

In an initial state, the color represented by the input signal is black. At this point, all the sub pixels included in the display device 400A in Comparative Example 1, namely, the yellow, red, green and blue sub pixels have a luminance level of "0". When the color represented by the input signal is started to be changed from black to yellow, the luminance level of each of the yellow, red and green sub pixels is started to be increased in the display device 400A in Comparative Example 1. On this stage, the luminance levels of the yellow, red and green sub pixels are increased at an equal rate to one another. As a result of the luminance level of each of the yellow, red and green sub pixels being increased, the chroma and the lightness of the color displayed by the pixel are increased. When the color represented by the input signal becomes the optimal color at this hue, the luminance level of each of the yellow, red and green sub pixels reaches "1" in the display device 400A in Comparative Example 1.

When the color represented by the input signal is started to be changed from yellow to white, the luminance level of the blue sub pixel is started to be increased while the luminance level of each of the yellow, red and green sub pixels is kept at "1" in the display device 400A in Comparative Example 1. When the color represented by the input signal becomes white, all the sub pixels have a luminance level of "1" in the display device 400A in Comparative Example 1. In this manner, when the color represented by the input signal is changed from black to white via yellow as shown in FIG. 7(*a*), the luminance level of each of the sub pixels included in the display device 400A in Comparative Example 1 is changed as shown in FIG. 7(*b*).

Figure 8:
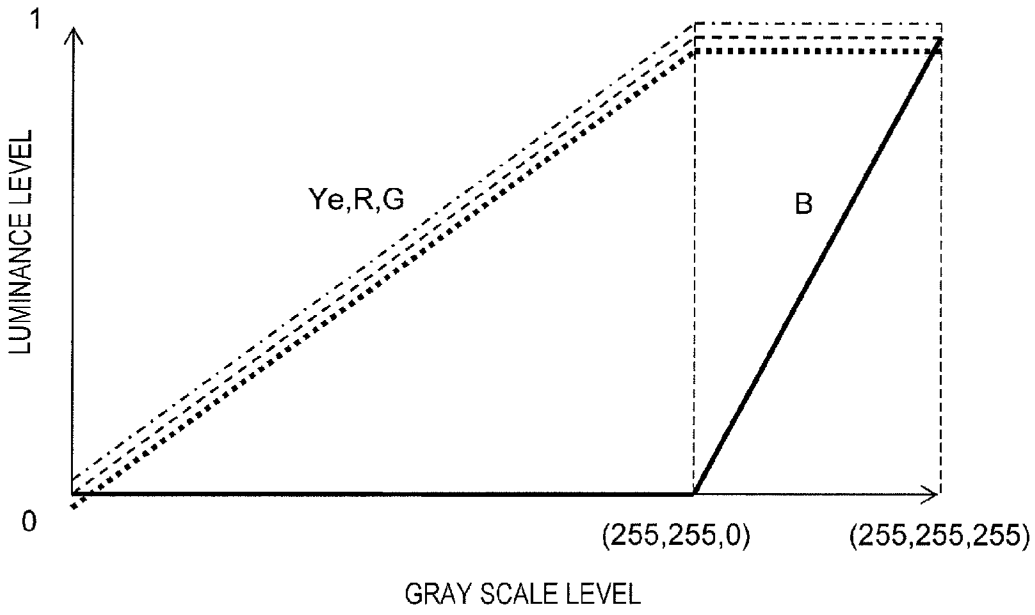
FIG. 8 is a graph showing a change of a luminance level of each of the sub pixels included in the multiple primary color display device in Comparative Example 1 with respect to a change of a gray scale level of the input signal.

FIG. 8 is a graph showing the relationship between the gray scale levels represented by the input signal and the luminance level of each of the sub pixels included in the display device 400A in Comparative Example 1.

When the gray scale levels of the input signal are changed from the gray scale levels corresponding black (0, 0, 0) to the gray scale levels (255, 255, 0), the luminance levels of the yellow, red and green sub pixels are increased at an equal rate to one another in the display device 400A in Comparative Example 1. Next, when the gray scale levels of the input signal are changed from the gray scale levels (255, 255, 0) to the gray scale levels corresponding white (255, 255, 255), the luminance level of the blue sub pixel is increased in the display device 400A in Comparative Example 1.

In this manner, in the display device 400A in Comparative Example 1, as the color of the input signal is changed, first, the luminance levels of the yellow, red and green sub pixels are increased at an equal rate to one another. After the luminance level of each of the yellow, red and green sub pixels reaches the maximum luminance level, the luminance level of the blue sub pixel is increased.

Figure 9:
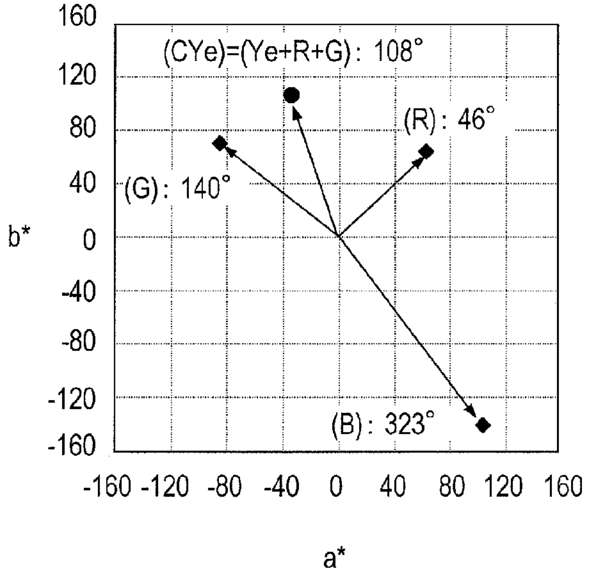
FIG. 9 is a chromaticity diagram of the L*a*b* colorimetric system obtained by plotting a* and b* in the multiple primary color display device in Comparative Example 1 when the input signal represents red, green, blue or yellow.

FIG. 9 is a chromaticity diagram of the L*a*b* colorimetric system obtained by plotting a* and b* in the display device 400A in Comparative Example 1 when the gray scale levels of red, green and blue of the input signal are (255, 0, 0), (0, 255, 0), (0, 0, 255) or (255, 255, 0). When the gray scale levels of red, green and blue of the input signal are (255, 0, 0), (0, 255, 0), (0, 0, 255) or (255, 255, 0), the display device 400A in Comparative Example 1 displays red, green, blue and yellow.

When the gray scale levels of red, green and blue of the input signal are (255, 0, 0), only the red sub pixel is lit in the display device 400A, and the hue angle of the hue (R) of the red sub pixel is 46°. When the gray scale levels of red, green and blue of the input signal are (0, 255, 0), only the green sub pixel is lit in the display device 400A, and the hue angle of the hue (B) of the green sub pixel is 140°. When the gray scale levels of red, green and blue of the input signal are (0, 0, 255), only the blue sub pixel is lit in the display device 400A, and the hue angle of the hue (B) of the blue sub pixel is 323°. When the gray scale levels of red, green and blue of the input signal are (255, 255, 0), the yellow, red and green sub pixels all have the maximum luminance level in the display device 400A. In the following description, the hue in the display device 400A in this case will be represented as "hue (CYe)". The hue angle of this hue (CYe=Ye+R+G) is 108°.

As is understood from comparison between FIG. 4 and FIG. 9, the hue angle of the hue (IYe) of yellow of the input signal is assumed to be 102°, whereas the hue angle of the hue (CYe) of yellow in the display device 400A in Comparative Example 1 is 108°. The hue (CYe) of yellow in the display device 400A is significantly different from the hue (IYe) of yellow of the input signal. Thus, in the display device 400A in Comparative Example 1, the display quality is decreased. Especially regarding yellow, the decrease of the display quality caused by the hue shift is conspicuous.

Figure 10:
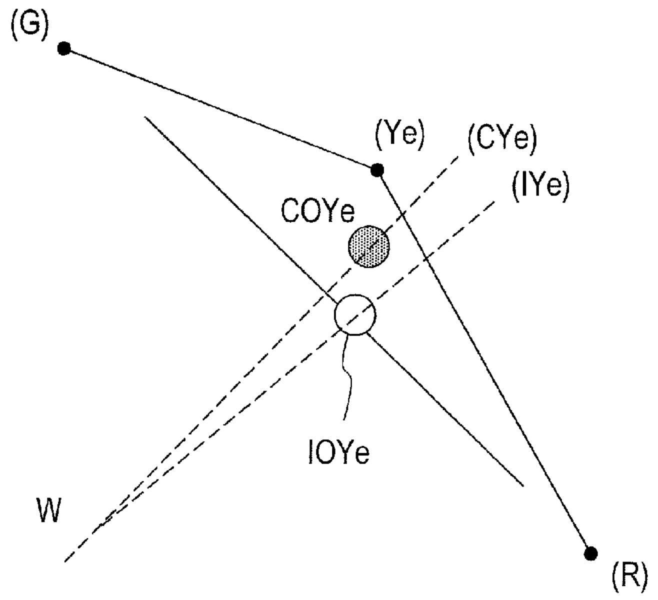
FIG. 10 is a partially enlarged view of an xy chromaticity diagram showing a difference between yellow of the input signal and yellow of the multiple primary color display device in Comparative Example 1.

FIG. 10 is a partially enlarged view of an xy chromaticity diagram schematically showing the hue (IYe) of yellow of the input signal and the hue (CYe) of yellow in the display device 400A in Comparative Example 1. In FIG. 10, chromaticity IOYe is the chromaticity of a three primary color display device when the gray scale levels of red, green and blue of the input signal are (255, 255, 0). Chromaticity COYe is the chromaticity of the display device 400A when the gray scale levels of red, green and blue of the input signal are (255, 255, 0).

The hue (Ye) of the yellow sub pixel in the display device 400A in Comparative Example 1 is closer to the hue (G) of the green sub pixel than the hue (IYe) of yellow of the input signal is. In the display device 400A in Comparative Example 1, the luminance level of the yellow sub pixel and also the luminance levels of the red and green sub pixels are increased at an equal rate to one another. Although the hue (CYe) is closer to the hue (R) of the red sub pixel than the hue (Ye) of the yellow sub pixel is, the hue (CYe) is closer to the hue (G) of the green sub pixel than the hue (IYe) of yellow of the input signal is as described above. As can be seen from this, the hue (CYe) of yellow in the display device 400A is significantly different from the hue (IYe) of yellow of the input signal. This decreases the display quality.

By contrast, in the display device 100 in this embodiment, as described above with reference to FIG. 5, when the color represented by the input signal is started to be changed from black to yellow, the luminance level of each of the yellow, red and green sub pixels is started to be increased without increasing the luminance level of the blue sub pixel, and in addition, the luminance level of the green sub pixel is increased at a lower rate than that of the luminance level of each of the yellow and red sub pixels. Therefore, the hue of yellow in the display device 100 approximately matches the hue (IYe) of yellow of the input signal. In the following description, the hue of yellow in the display device 100 in this embodiment when the input signal represents yellow of the hue (IYe) may be represented as "hue (DYe)".

Figure 11:
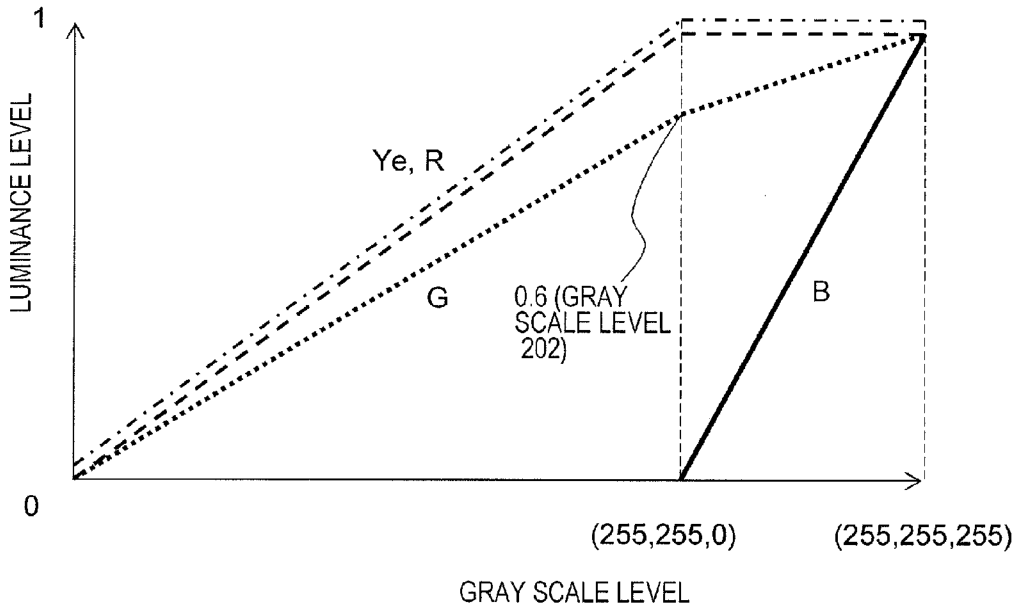
FIG. 11 is a graph showing a change of a luminance level of each of the sub pixels included in the multiple primary color display device in Embodiment 1 with respect to a change of a gray scale level of the input signal.

FIG. 11 is a graph showing the relationship between the gray scale levels represented by the input signal and the luminance level of each of the sub pixels in the display device 100.

When the gray scale levels of the input signal are changed from the gray scale levels corresponding black (0, 0, 0) to the gray scale levels (255, 255, 0), the luminance level of each of the yellow, red and green sub pixels is increased in the display device 100. On this stage, the luminance level of the green sub pixel is increased at a lower rate than that of the luminance level of each of the yellow and red sub pixels. When, for example, the gray scale levels of the input signal are (255, 255, 0), the luminance levels of the red, green, blue and yellow sub pixels in the display device 100 are (1, 0.6, 0, 1). These correspond to the gray scale levels (255, 202, 0, 255) in the 255 gray scale representation.

When the gray scale levels of the input signal are changed from the gray scale levels (255, 255, 0) to the gray scale levels corresponding white (255, 255, 255), the luminance level of the green sub pixel is further increased and the luminance level of the blue sub pixel is increased in the display device 100.

In this manner, in the display device 100, as the color of the input signal is changed, first, the luminance level of each of the yellow, red and green sub pixels is increased. On this stage, the luminance level of the green sub pixel is increased at a lower rate than that of the luminance level of each of the yellow and red sub pixels. When the luminance level of each of the yellow and red sub pixels reaches the maximum luminance level, the luminance level of the green sub pixel is further increased and the luminance level of the blue sub pixel is started to be increased.

Figure 12:
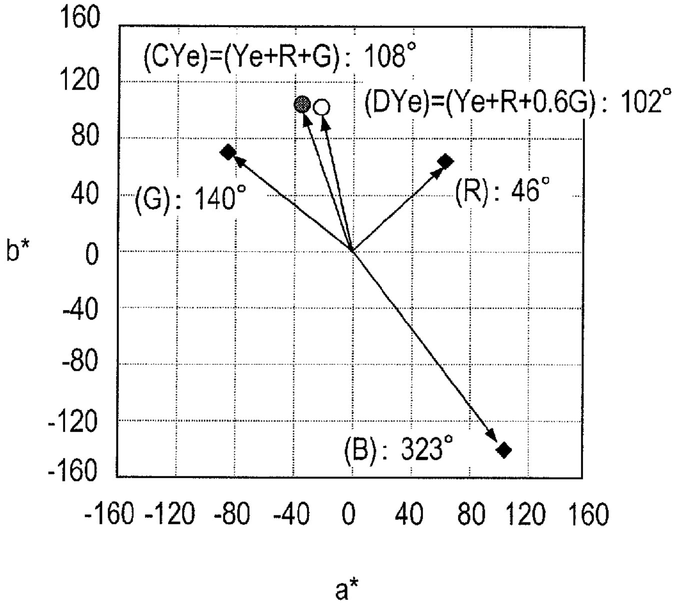
FIG. 12 is a chromaticity diagram of the L*a*b* colorimetric system obtained by plotting a* and b* in the multiple primary color display device in Example 1 when the input signal represents red, green, blue or yellow.

FIG. 12 is a chromaticity diagram of the L*a*b* colorimetric system obtained by plotting a* and b* in the display device 100 when the gray scale levels of red, green and blue of the input signal are (255, 0, 0), (0, 255, 0), (0, 0, 255) or (255, 255, 0).

Like in the case described above, when the gray scale levels of red, green and blue of the input signal are (255, 0, 0), (0, 255, 0) or (0, 0, 255), one of the red, green and blue sub pixels is lit in the display device 100, and the hue angles of the hues of the red, green and blue sub pixels, namely, (R), (G) and (B) are respectively 46°, 140° and 323°. When the gray scale levels of red, green and blue of the input signal are (255, 255, 0), the yellow, red and green sub pixels are lit in the display device 100. However, the luminance level of the green sub pixel is lower than the luminance level of each of the yellow and red sub pixels. The luminance level of the green sub pixel is 0.6 times the luminance level of each of the yellow and red sub pixels. In this case, the hue angle of the hue (DYe=Ye+R+0.6G) is 102°.

Figure 13:
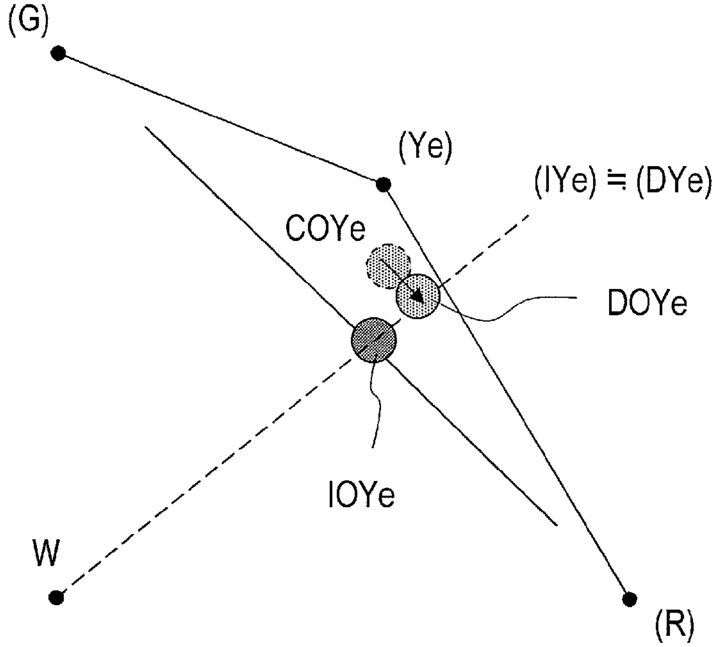
FIG. 13 is a partially enlarged view of an xy chromaticity diagram showing a difference between yellow of the input signal and yellow of the multiple primary color display device in Comparative Example 1.

FIG. 13 is a partially enlarged view of an xy chromaticity diagram schematically showing the hue (IYe) of yellow of the input signal and the hue (DYe) of yellow in the display device 100. In FIG. 13 also, chromaticity IOYe is the chromaticity of a three primary color display device when the gray scale levels of red, green and blue of the input signal are (255, 255, 0). Chromaticity COYe is the chromaticity of the display device 400A when the gray scale levels of red, green and blue of the input signal are (255, 255, 0). Chromaticity DOYe is the chromaticity of the display device 100 when the gray scale levels of red, green and blue of the input signal are (255, 255, 0). As described above, the hue (Ye) of the yellow sub pixel is on the side of the hue (G) of the green sub pixel with respect to the hue (IYe) of yellow of the input signal.

In the display device 100, the luminance level of each of the red and green sub pixels is increased together with the luminance level of the yellow sub pixel, but the luminance level of the green sub pixel is increased at a lower rate than that of the luminance level of each of the yellow and red sub pixels. As a result, the hue (DYe) of yellow in the display device 100 is shifted more toward the hue (R) of the red sub pixel than toward the hue (CYe) of yellow in the display device 400A. Therefore, the hue (DYe) of yellow in the display device 100 can approximately match the hue (IYe) of yellow of the input signal. Thus, the decrease of the display quality can be suppressed.

It should be noted that the description given above with reference to FIG. 5 and FIG. 11 is not only regarding the timing to start lighting the sub pixels (timing to increase the luminance levels) when the color represented by the input signal is changed from black to white via yellow. The description given above with reference to FIG. 5 and FIG. 11 is an algorithm for setting the luminance levels (gray scale levels) of the sub pixels corresponding to the color represented by the input signal. Namely, in the display device 100 in this embodiment, a combination of the luminance levels of the sub pixels for displaying the color represented by the input signal is set based on the above-described algorithm. In other words, FIGS. 5 and 11 do not only show the timing to light the sub pixels (timing to start increasing the luminance levels) but show the combination itself of the luminance levels of the sub pixels for displaying the color represented by the input signal. When, for example, the gray scale levels of red, green and blue of the input signal are (255, 255, 0), the luminance levels of the yellow, red, green and blue sub pixels are set to "1", "1", "0.6" and "0" in the display device 100. The luminance level of each sub pixel may be prepared in advance based on the above-described algorithm, or may be generated by computation. In this manner, in the display device 100 in this embodiment, yellow of the hue (DYe) approximately matching the hue (IYe) of yellow of the input signal can be displayed based on the above-described algorithm.

Figure 14:
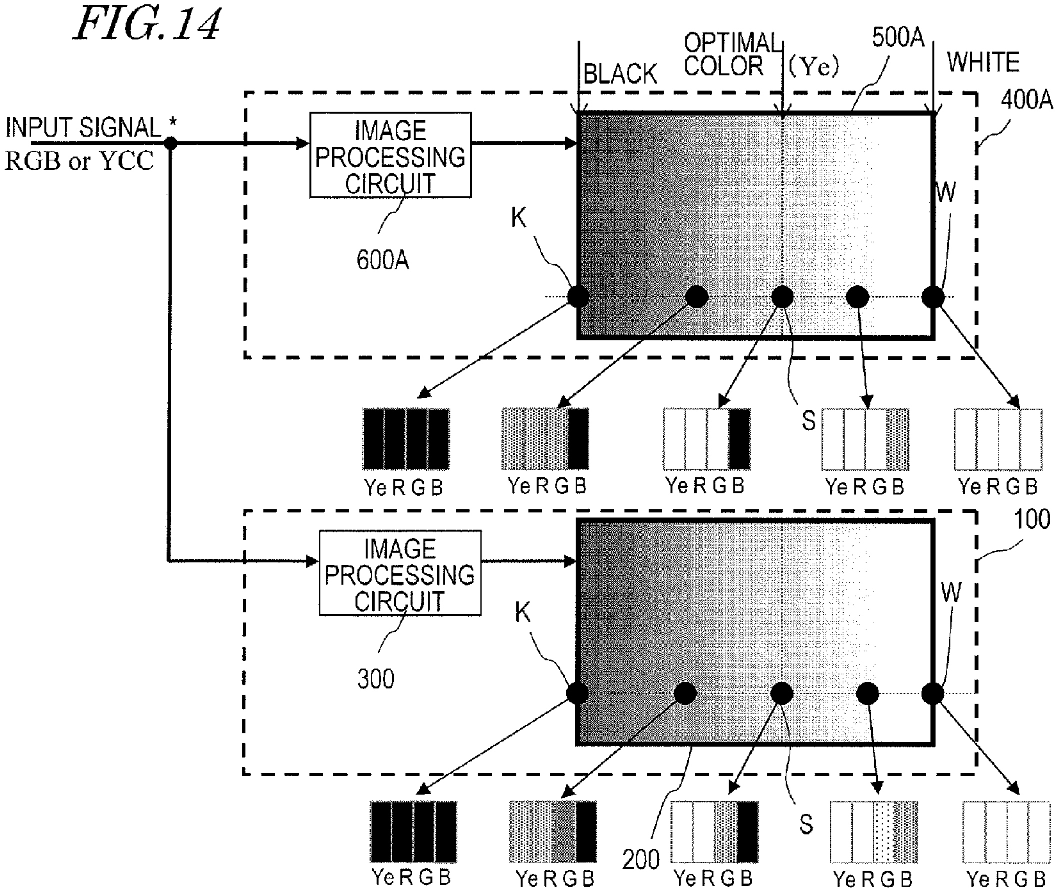
FIG. 14 is a schematic view showing a difference between the multiple primary color display device in Embodiment 1 and the multiple primary color display device in Comparative Example 1.

FIG. 14 is a schematic view showing a difference between the display device 100 in this embodiment and the display device 400A in Comparative Example 1.

As shown in FIG. 14, the same input signal is input into to both of the display device 100 in this embodiment and the display device 400A in Comparative Example 1. This input signal allows the entirety of the multiple primary color panel 200 and the entirety of the multiple primary color panel 500A to provide gradation display which is changed from black to white via yellow. By use of such an input signal, it can be easily found whether the multiple primary color display device is the display device 100 in this embodiment or not.

As shown in FIG. 14, in the multiple primary color panel 200, the yellow, red, green and blue sub pixels each have a strip-like shape. In this example, the yellow, red, green and blue sub pixels are arranged in stripes in this order. Similarly in the multiple primary color panel 500A, the yellow, red, green and blue sub pixels each have a strip-like shape, and are arranged in stripes in this order.

In the display device 400A in Comparative Example 1, part K of the multiple primary color panel 500A displays black. In part K, all the sub pixels have a luminance level of "0". Part S of the multiple primary color panel 500A displays an optimal color of yellow. In part S, the yellow, red and green sub pixels each have a luminance level of "1", and the blue sub pixel has a luminance level of "0". Part W of the multiple primary color panel 500A displays white. In part W, all the sub pixels have a luminance level of "1". In the multiple primary color panel 500A, as progressing from the part K toward part S, the luminance level of each of the yellow, red and green sub pixels is increased and the lightness of the pixel is risen. In the multiple primary color panel 500A, as progressing from the part S toward part W, the luminance level of the blue sub pixel is increased. As a result, the lightness of the pixel is risen.

Meanwhile, in the display device 100, part K of the multiple primary color panel 200 displays black. Therefore, in part K, all the sub pixels have a luminance level of "0". Part S of the multiple primary color panel 200 displays an optimal color of yellow. In part S, the yellow and red sub pixels each have a luminance level of "1", whereas the green sub pixel has a luminance level of lower than "1". For example, the luminance level of the green sub pixel is "0.6". The luminance level of the blue sub pixel is "0". Part W of the multiple primary color panel 200 displays white. In part W, all the sub pixels have a luminance level of "1". In the multiple primary color panel 200, as progressing from the part K toward part S, first, the luminance level of each of the yellow, red and green sub pixels is increased. As a result, the lightness of the pixel is risen. In the multiple primary color panel 200, as progressing from the part S toward part W, the luminance level of each of the green and blue sub pixels is increased. As a result, the lightness of the pixel is risen. The luminance level of each of these sub pixels can be checked by observing a pixel of the multiple primary color panel 200 and a pixel of the multiple primary color panel 500A, which provide gradation display, in the state of being enlarged by use of a loupe or the like.

Preferably, the difference of the hue angle of yellow in the display device 100 from the hue angle of yellow represented by the input signal is within ±3°. As described above, the hue angle h is represented as $h=\tan^{-1}(b^*/a^*)$.

$L^*$, $a^*$ and $b^*$ are represented as follows.

$$L^*=116\times f(Y)-16$$

$$a^*=500\times[f(X)-f(Y)]$$

$$b^*=200\times[f(Y)-f(Z)]$$

When $X/Xn>(24/116)^3$, f(X) is represented as $f(X)=(X/Xn)^{1/3}$. When $X/Xn\leqq(24/116)^3$, f(X) is represented as $f(X)=(841/108)\times(X/Xn)+16/116$.

When $Y/Yn>(24/116)^3$, f(Y) is represented as $f(Y)=(Y/Yn)^{1/3}$. When $Y/Yn\leqq(24/116)^3$, f(Y) is represented as $f(Y)=(841/108)\times(Y/Yn)+16/116$.

When $Z/Zn>(24/116)^3$, f(Z) is represented as $f(Z)=(Z/Zn)^{1/3}$. When $Z/Zn\leqq(24/116)^3$, f(Z) is represented as $f(Z)=(841/108)\times(Z/Zn)+16/116$.

In the above, Xn, Yn and Zn are tristimulus values at a perfect diffuse reflection surface. In this example, Xn=95.04, Yn=100, and Zn=108.88. These correspond to tristimulus values at a $D_{65}$ perfect diffuse reflection surface. Precisely describing, the tristimulus values of white of the multiple primary color panel 200 need to be measured because the color temperature is often set differently and thus white of the multiple primary color panel 200 does not necessarily correspond to $D_{65}$. However, even if the tristimulus values are not measured precisely, there is almost no influence. Especially regarding the hue of yellow, there is almost no difference with respect to the difference in the color temperature of the panel.

In the above description, when the hue of the input signal corresponding to the gray scale levels of red, green and blue of (255, 255, 0) (i.e., the hue (IYe)) is different from any of the hues of the red, green, blue and yellow sub pixels in the display device 100, i.e., (R), (G), (B) and (Ye), the rate of increase of the luminance level of the green sub pixel is lower than the rate of increase of the luminance level of each of the yellow and red sub pixels. When, for example, the hue of the input signal corresponding to gray scale levels different from the gray scale levels of red, green and blue of (255, 255, 0) is approximately equal to the hue (Ye) of the yellow sub pixel in the display device 100, the luminance levels of the red, green and yellow sub pixels may be increased at an equal rate to one another. When, for example, the color represented by the input signal is changed from black to black via yellow of the hue (Ye) of the yellow sub pixel in the display device 100, the luminance levels of the sub pixels in the display device 100 may be changed as shown in FIG. 7(*b*).

In general, on the stage of setting a multiple primary color panel, it is ideal to set the hue (Ye) of the yellow sub pixel to be approximately equal to the hue (IYe) of yellow of the input signal. However, it is not always possible to set the hue (Ye) of the yellow sub pixel ideally because there are limitations on the light emission characteristics of the backlight device or the spectral transmittance characteristics of the color filter from the viewpoint of productivity. In the above description, the hue (Ye) of the yellow sub pixel is positioned closer to the hue (G) of the green sub pixel than the hue (IYe) of yellow of the input signal is, and the hue (IYe) of yellow of the input signal is between the hue (Ye) of the yellow sub pixel and the hue (R) of the red sub pixel in the display device 100. However, the present invention is not limited to this. Depending on the backlight device, the color filter or the like, the hue (Ye) of the yellow sub pixel may be positioned closer to the hue (R) of the red sub pixel than the hue (IYe) of yellow of the input signal is, namely, the hue (IYe) of yellow of the input signal may be positioned between the hue (Ye) of the yellow sub pixel and the hue (G) of the green sub pixel in the display device 100.

In this case also, when the color represented by the input signal is changed from black to white via yellow, the luminance level of each of the red and green sub pixels is started to be increased together with the luminance level of the yellow sub pixel without increasing the luminance level of the blue sub pixel in the display device 100. On this stage, the luminance level of the red sub pixel is increased at a lower rate than that of the luminance level of each of the yellow and green sub pixels. As a result the decrease of the display quality can be suppressed.

In the above description, each of the pixels of the display device 100 includes the red, green, blue and yellow sub pixels, but the present invention is not limited to this. Each pixel may include red, green, blue and cyan sub pixels.

In the following description, it is assumed that the gray scale levels of green and blue of the input signal are increased to the maximum gray scale level at an equal rate to each other and then the gray scale level of red is increased to the maximum gray scale level, so that the color is changed from black to white via cyan. The hue of this cyan is represented as "(IC)". The hue (IC) of cyan of the input signal is closest to, but different from, the hue of the cyan sub pixel among the red, green, blue and cyan sub pixels in the display device 100.

In the case where the hue (IC) of cyan of the input signal is between the hue of the cyan sub pixel and the hue of the green sub pixel in the display device 100, when the color represented by the input signal is changed from black to white via cyan, the luminance level of each of the green and blue sub pixels is started to be increased together with the luminance level of the cyan sub pixel without increasing the luminance level of the red sub pixel in the display device 100. On this stage, the luminance level of the blue sub pixel is increased at a lower rate than that of the luminance level of each of the cyan and green sub pixels. As a result, the decrease of the display quality can be suppressed.

Alternatively, in the case where the hue (IC) of cyan of the input signal is between the hue of the cyan sub pixel and the hue of the blue sub pixel in the display device 100, when the color represented by the input signal is changed from black to white via cyan, the luminance level of each of the green and blue sub pixels is started to be increased together with the luminance level of the cyan sub pixel without increasing the luminance level of the red sub pixel in the display device 100. On this stage, the luminance level of the green sub pixel is increased at a lower rate than that of the luminance level of each of the cyan and blue sub pixels. As a result, the decrease of the display quality can be suppressed.

Alternatively, each pixel in the display device 100 may include red, green, blue and magenta sub pixels.

In the following description, it is assumed that the gray scale levels of red and blue of the input signal are increased to the maximum gray scale level at an equal rate to each other and then the gray scale level of green is increased to the maximum gray scale level, so that the color is changed from black to white via magenta. The hue of this magenta is represented as "(IM)". The hue (IM) of magenta of the input signal is closest to, but different from, the hue of the magenta sub pixel among the red, green, blue and magenta sub pixels in the display device 100.

In the case where the hue (IM) of magenta of the input signal is between the hue of the magenta sub pixel and the hue of the red sub pixel in the display device 100, when the color represented by the input signal is changed from black to white via magenta, the luminance level of each of the red and blue sub pixels is started to be increased together with the luminance level of the magenta sub pixel without increasing the luminance level of the green sub pixel in the display device 100. On this stage, the luminance level of the blue sub pixel is increased at a lower rate than that of the luminance level of each of the magenta and red sub pixels. As a result, the decrease of the display quality can be suppressed.

Alternatively, in the case where the hue (IM) of magenta of the input signal is between the hue of the magenta sub pixel and the hue of the blue sub pixel in the display device 100, when the color represented by the input signal is changed from black to white via magenta, the luminance level of each of the red and blue sub pixels is started to be increased together with the luminance level of the magenta sub pixel without increasing the luminance level of the green sub pixel in the display device 100. On this stage, the luminance level of the red sub pixel is increased at a lower rate than that of the luminance level of each of the magenta and blue sub pixels. As a result, the decrease of the display quality can be suppressed.

Figure 15:
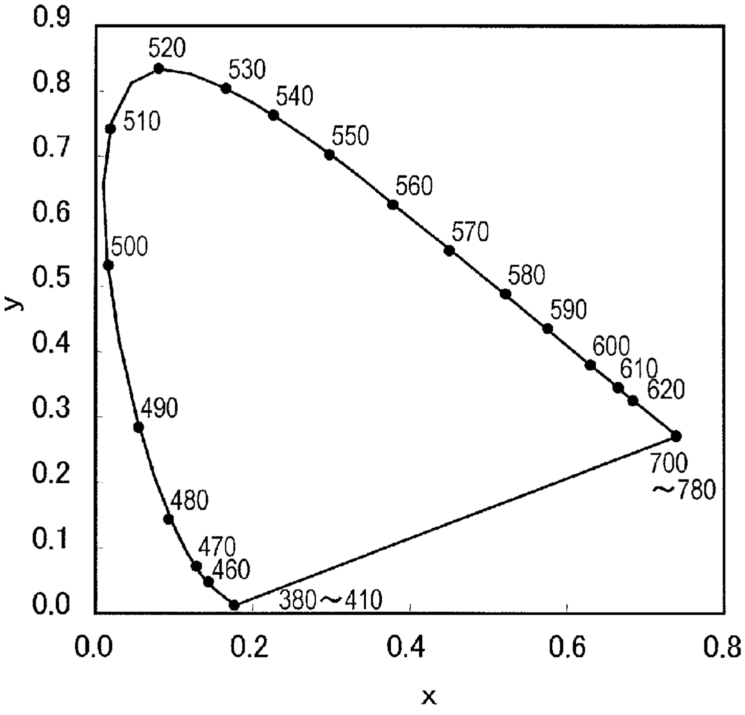
FIG. 15 is a schematic view showing a chromaticity diagram of an XYZ colorimetric system.

FIG. 15 is a schematic view showing a chromaticity diagram of an XYZ colorimetric system. FIG. 15 shows a spectrum locus and dominant wavelengths. In this specification, the dominant wavelength of the red sub pixel is 605 nm or greater and 635 nm or less, the dominant wavelength of the yellow sub pixel is 565 nm or greater and 580 nm or less, the dominant wavelength of the green sub pixel is 520 nm or greater and 550 nm or less, the dominant wavelength of the cyan sub pixel is 475 nm or greater and 500 nm or less, and the dominant wavelength of the blue sub pixel is 470 nm or less. A complementary wavelength of the magenta sub pixel is 495 nm or greater and 565 nm or less.

Embodiment 2

In the above-described display device, when the color represented by the input signal is changed from black to a color of a prescribed hue, the luminance level of each of three sub pixels in the display device is started to be increased. The present invention is not limited to this.

Hereinafter, a multiple primary color display device in Embodiment 2 according to the present invention will be described. The multiple primary color display device 100 in this embodiment has substantially the same structure as that of the display device in Embodiment 1 described above with reference to FIG. 1 except for conversion performed by the image processing circuit 300. Overlapping descriptions will be omitted in order to avoid redundancy.

In the following description, it is assumed that the gray scale levels of red and green of the input signal are increased to the maximum gray scale level at an equal rate to each other and then the gray scale level of blue is increased to the maximum gray scale level, so that the color is changed from black to white via yellow. The hue of this yellow is represented as "(IYe)".

The hue (IYe) of yellow of the input signal is different from any of the hues of the red, green, blue and yellow sub pixels in the display device 100, i.e., (R), (G), (B) and (Ye). The hue (IYe) of yellow of the input signal is closest to the hue (Ye) of the yellow sub pixel among the red, green, blue and yellow sub pixels in the display device 100. The hue (IYe) of yellow of the input signal is between the hue (Ye) of the yellow sub pixel and the hue (R) of the red sub pixel in the display device 100. The hue angle of the hue (IYe) of yellow of the input signal is, for example, 102°.

In the display device 100 in this embodiment, when the color represented by the input signal is changed from black to white via yellow, the luminance level of each of the yellow and red sub pixels is started to be increased without increasing the luminance level of each of the green and blue sub pixels. On this stage, the luminance level of the red sub pixel is set to be increased at a lower rate than that of the luminance level of the yellow sub pixel.

Figure 16:
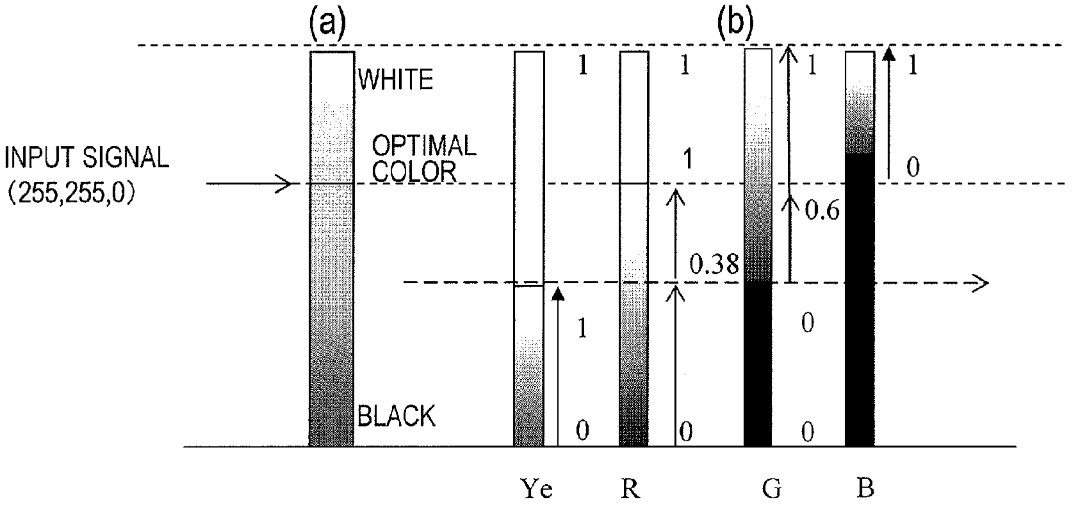
FIG. 16(*a*) shows a change of a color represented by the input signal.

Now, with reference to FIG. 16, the relationship between the change of the color represented by the input signal and the change of the luminance level of each sub pixel included in the display device 100 in this embodiment will be described. FIG. 16(*a*) shows a change of the color represented by the input signal, and FIG. 16(*b*) shows a change of the luminance level of each of the yellow, red, green and blue sub pixels included in the display device 100.

In an initial state, the color represented by the input signal is black. At this point, all the sub pixels included in the display device 100, namely, the yellow, red, green and blue sub pixels have a luminance level of "0". When the color represented by the input signal is started to be changed from black to yellow, the luminance level of each of the yellow and red sub pixels is started to be increased without increasing the luminance level of each of the green and blue sub pixels in the display device 100 in this embodiment. On this stage, the luminance level of the red sub pixel is increased at a lower rate than that of the luminance level of the yellow sub pixels. As a result of the luminance level of each of the yellow and red sub pixels being increased, the chroma and the lightness of the color displayed by the pixel are increased.

When the lightness of the color represented by the input signal is increased, the luminance level of the yellow sub pixel reaches "1" in the display device 100. At this point, the luminance level of the red sub pixel is lower than "1". For example, the luminance level of the red sub pixel is "0.38", which corresponds to gray scale level 165 in the 255 gray scale representation. Then, when the lightness of the color represented by the input signal is further increased, the luminance level of the red sub pixel is increased and the luminance level of the green sub pixel is started to be increased in the display device 100.

When the color represented by the input signal becomes an optimal color at this hue, the luminance level of the red sub pixel reaches “1” in the display device 100. At this point, the luminance level of the green sub pixel is lower than 1. For example, the luminance level of the green sub pixel is “0.6”, which corresponds to gray scale level 202 in the 255 ray scale representation.

Then, when the color represented by the input signal is started to be changed from yellow to white, the luminance level of the green sub pixel is increased and the luminance level of the blue sub pixel is started to be increased while the luminance level of each of the yellow and red sub pixels is kept at “1” in the display device 100. When the color represented by the input signal becomes white, all the sub pixels has a luminance of “1” in the display device 100 in this embodiment. In this manner, when the color represented by the input signal is changed from black to white via yellow as shown in FIG. 16(*a*), the luminance level of each of the sub pixels included in the display device in this embodiment is changed as shown in FIG. 16(*b*).

Ideally, the luminance level of the red sub pixel is started to be increased at the same time as the luminance level of the yellow sub pixel. However, as described above, the rate of increase of the luminance level of the yellow sub pixel is higher than the rate of increase of the red sub pixel. Therefore, in actuality, as a result of, for example, the quantization of numerical figures of the circuit embodying the above-described control, the luminance level of the yellow sub pixel may occasionally be started to be increased first, followed by the increase of the luminance level of the red sub pixel.

In general, as the number of sub pixels to be lit is larger, the chroma of the color displayed by the pixel is lower. Therefore, the display device 100 in this embodiment can provide display in a wider color reproduction range than the display device in Embodiment 1 described above.

Hereinafter, advantages of the display device 100 in this embodiment will be described as compared with a display device 400B in Comparative Example 2. First, with reference to FIG. 17 through FIG. 21, the display device 400B in Comparative Example 2 will be described. In the display device 400B in Comparative Example 2 also, each of pixels includes red, green, blue and yellow sub pixels.

Figure 17:
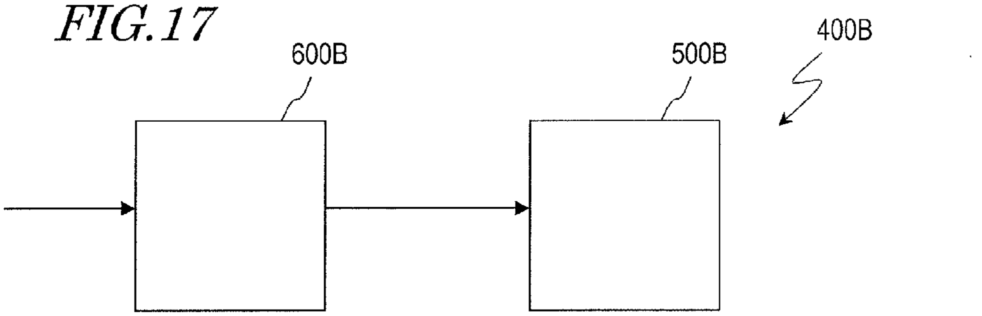
FIG. 17 is a schematic block diagram showing a multiple primary color display device in Comparative Example 2.

FIG. 17 is a schematic block diagram of the display device 400B in Comparative Example 2. The display device 400B includes a multiple primary color panel 500B and an image processing circuit 600B. The multiple primary color panel 500B in the display device 400B in Comparative Example 2 has substantially the same structure as that of the multiple primary color panel 200 in the display device 100 in this embodiment. However, the image processing circuit 600B in the display device 400B in Comparative Example 2 is different from the image processing circuit 300 in the display device 100 in this embodiment in terms of conversion into a multiple primary color signal based on an input signal.

Figure 18:
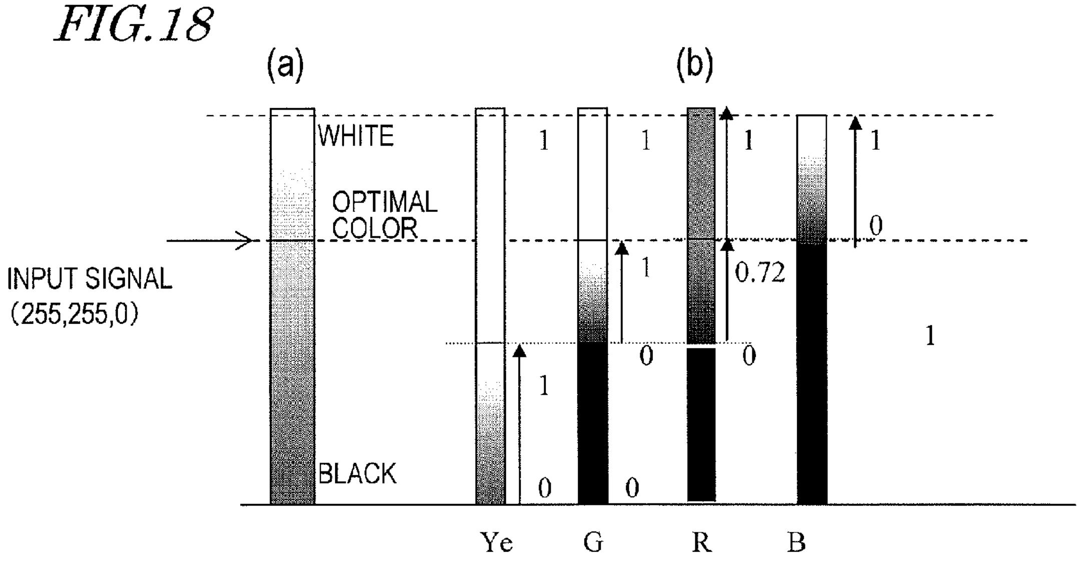
FIG. 18(*a*) shows a change of a color represented by the input signal.

Now, with reference to FIG. 18, the relationship between the change of the color represented by the input signal and the change of the luminance level of each sub pixel included in the display device 400B in Comparative Example 2 will be described. FIG. 18(*a*) shows a change of the color represented by the input signal, and FIG. 18(*b*) shows a change of the luminance level of each of the yellow, red, green and blue sub pixels included in the display device 400B.

In an initial state, the color represented by the input signal is black. At this point, all the sub pixels included in the display device 400B in the Comparative Example 2, namely, the yellow, red, green and blue sub pixels have a luminance level of “0”. When the color represented by the input signal is started to be changed from black to yellow, the luminance level of the yellow sub pixel is started to be increased in the display device 400B in Comparative Example 2. As a result of the luminance level of the yellow sub pixel being increased, the chroma and the lightness of the color displayed by the pixel are increased.

When the lightness of the color represented by the input signal is further increased, the luminance level of the yellow sub pixel reaches “1” in the display device 400B in Comparative Example 2. Then, when the lightness of the color represented by the input signal is further increased, the luminance level of each of the green and red sub pixels is started to be increased in the display device 400B in Comparative Example 2. On this stage, the luminance level of the green sub pixel is increased at a higher rate than that of the luminance level of the red sub pixel.

When the color represented by the input signal becomes an optimal color at this hue, the luminance level of the green sub pixel reaches “1” in the display device 400B in Comparative Example 2. At this point, the luminance level of the red sub pixel is lower than “1”. For example, the luminance level of the red sub pixel is “0.72”, which corresponds to gray scale level 220 in the 255 gray scale representation.

Then, when the color represented by the input signal starts to be changed from yellow to white, the luminance level of the red sub pixel is increased and the luminance level of the blue sub pixel is started to be increased while the luminance level of each of the yellow and green sub pixels is kept at “1” in the display device 400B in Comparative Example 2. When the color represented by the input signal becomes white, all the sub pixels have a luminance level of “1” in the display device 400B in Comparative Example 2. In this manner, when the color represented by the input signal is changed from black to white via yellow as shown in FIG. 18(*a*), the luminance level of each of the sub pixels included in the display device 400B in Comparative Example 2 is changed as shown in FIG. 18(*b*).

Figure 19:
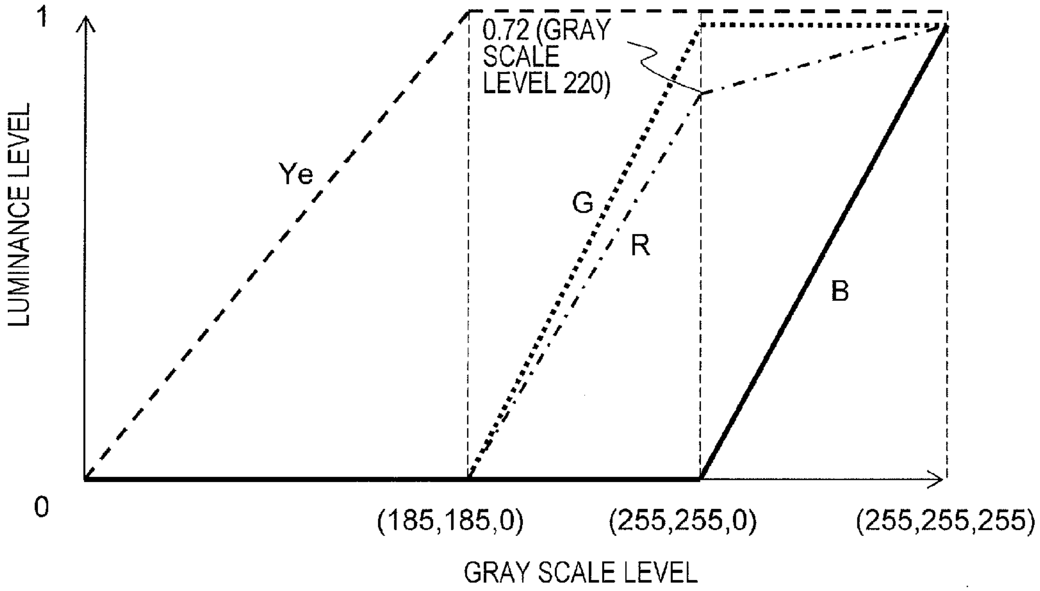
FIG. 19 is a graph showing a change of a luminance level of each of the sub pixels included in the multiple primary color display device in Comparative Example 2 with respect to a change of a gray scale level of the input signal.

FIG. 19 is a graph showing the relationship between the gray scale levels represented by the input signal and the luminance level of each of the sub pixels included in the display device 400B in Comparative Example 2.

When the gray scale levels of the input signal are changed from the gray scale levels corresponding black (0, 0, 0) to the gray scale levels (185, 185, 0), the luminance level of the yellow sub pixel is increased and reaches the maximum luminance level in the display device 400B in Comparative Example 2. Then, when the gray scale levels of the input signal are changed from the gray scale levels (185, 185, 0) to the gray scale levels corresponding white (255, 255, 255), the luminance level of each of the red and green sub pixels is increased. When the gray scale levels of the input signal are (255, 255, 0), the luminance level of the green sub pixel reaches the maximum luminance level. At this point, the luminance levels of the red, green, blue and yellow sub pixels are (0.72, 1, 0, 1) in the display device 400B, which correspond to the gray scale levels (220, 255, 0, 255) of the 255 gray scale level representation.

When the gray scale levels of the input signal are changed from the gray scale levels (255, 255, 0) to the gray scale levels corresponding white (255, 255, 255), the luminance level of each of the red and blue sub pixels is increased in the display device 400B in Comparative Example 2.

In this manner, in the display device 400B in Comparative Example 2, as the color of the input signal is changed, first, the luminance level of the yellow sub pixel is increased. After the luminance level of the yellow sub pixel reaches the maximum luminance level, the luminance level of each of the green and red sub pixels is increased. On this stage, the luminance level of the red sub pixel is increased at a lower rate than that of the luminance level of the green sub pixel, so that the change of the hue is suppressed. Then, after the luminance level of the green sub pixel reaches the maximum luminance level, the luminance level of the red sub pixel is further increased and the luminance level of the blue sub pixel is started to be increased.

Figure 20:
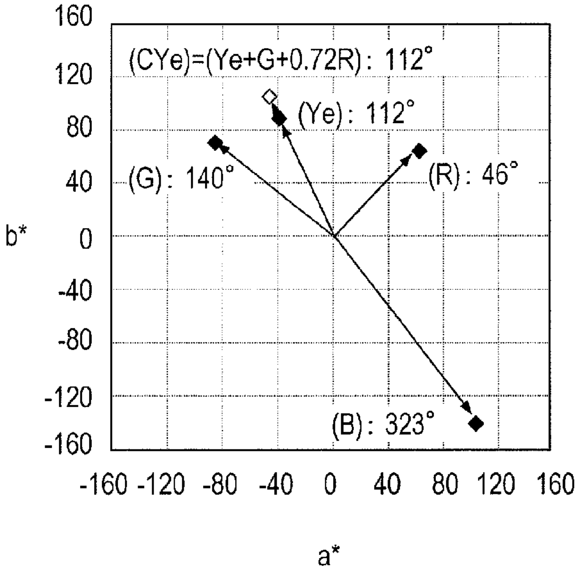
FIG. 20 is a chromaticity diagram of the L*a*b* colorimetric system obtained by plotting a* and b* in the multiple primary color display device in Comparative Example 2 when the input signal represents red, green, blue or yellow.

FIG. 20 is a chromaticity diagram of the L*a*b* colorimetric system obtained by plotting a* and b* in the display device 400B in Comparative Example 2 when the gray scale levels of red, green and blue of the input signal are (255, 0, 0), (0, 255, 0), (0, 0, 255) or (255, 255, 0).

Like in the case described above, when the gray scale levels of red, green and blue of the input signal are (255, 0, 0), (0, 255, 0) or (0, 0, 255), one of the red, green and blue sub pixels is lit in the display device 100, and the hue angles of the hues of the red, green and blue sub pixels, namely, (R), (G) and (B) are respectively 46°, 140° and 323°. When the gray scale levels of red, green and blue of the input signal are (255, 255, 0), the yellow, red and green sub pixels are lit in the display device 400B, and the luminance levels of the red, green, blue and yellow sub pixels are (0.72, 1, 0, 1). In the following description, the hue in the display device 400B in this case will be represented as "hue (CYe)". The hue angle of this hue (CYe=Ye+G+0.72R) is 112°.

As is understood from comparison between FIG. 4 and FIG. 20, the hue angle of the hue (IYe) of yellow of the input signal is assumed to be 102°, whereas the hue angle of the hue (CYe) of yellow in the display device 400B in Comparative Example 2 is 112°. The color in the display device 400B is significantly different from the color represented by the input signal. Thus, the display quality is decreased.

Figure 21:
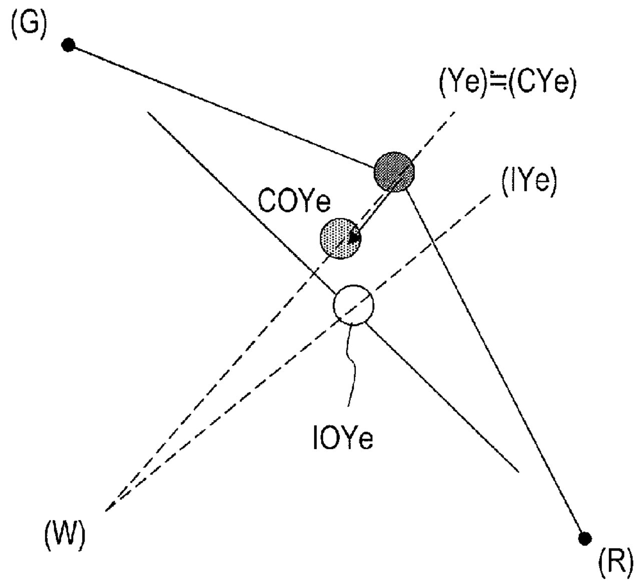
FIG. 21 is a partially enlarged view of an xy chromaticity diagram showing a difference between yellow of the input signal and yellow of the multiple primary color display device in Comparative Example 2.

FIG. 21 is a partially enlarged view of an xy chromaticity diagram schematically showing the hue (IYe) of yellow of the input signal and the hue (Ye) of yellow in the display device 400B in Comparative Example 2. In FIG. 21, chromaticity IOYe is the chromaticity of a three primary color display device when the gray scale levels of red, green and blue of the input signal are (255, 255, 0). Chromaticity COYe is the chromaticity of the display device 400B when the gray scale levels of red, green and blue of the input signal are (255, 255, 0).

The hue (Ye) of the yellow sub pixel in the display device 400B in Comparative Example 2 is closer to the hue (G) of the green sub pixel than the hue (IYe) of yellow of the input signal is. In the display device 400B in Comparative Example 2, the luminance level of the yellow sub pixel is increased, and therefore, the hue (CYe) of yellow in the display device 400B is closer to the hue (B) of the green sub pixel than the hue (IYe) of yellow of the input signal is. As can be seen from this, the hue (CYe) of yellow in the display device 400B is significantly different from the hue (IYe) of yellow of the input signal. This decreases the display quality.

By contrast, in the display device 100 in this embodiment, as described above with reference to FIG. 16, when the color represented by the input signal is started to be changed from black to yellow, the luminance level of each of the yellow and red sub pixels is started to be increased. On this stage, the luminance level of the red sub pixel is increased at a lower rate than that of the luminance level of the yellow sub pixel. As a result, the hue of yellow in the display device 100 can approximately match the hue (IYe) of yellow of the input signal. In the following description, the hue of yellow in the display device 100 in this embodiment when the input signal represents yellow of the hue (IYe) will be represented as "hue (DYe)".

Figure 22:
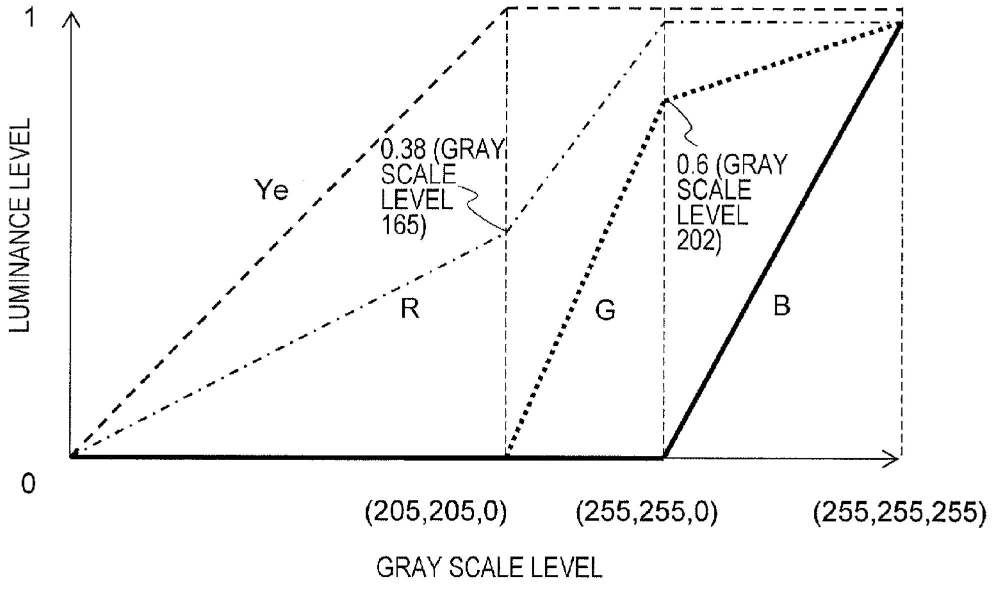
FIG. 22 is a graph showing a change of a luminance level of each of the sub pixels included in a multiple primary color display device in Embodiment 2 with respect to a change of a gray scale level of the input signal.

FIG. 22 is a graph showing the relationship between the gray scale levels represented by the input signal and the luminance level of each of the sub pixels in the display device 100.

When the gray scale levels of the input signal are changed from the gray scale levels corresponding black (0, 0, 0) to the gray scale levels (205, 205, 0), the luminance level of each of the yellow and red sub pixels is increased in the display device 100. On this stage, the luminance level of the red sub pixel is increased at a lower rate than that of the luminance level of the yellow sub pixel. When, for example, the gray scale levels of the input signal are (205, 205, 0), the luminance levels of the red, green, blue and yellow sub pixels in the display device 100 are (0.38, 0, 0, 1). These correspond to the gray scale levels (165, 0, 0, 255) in the 255 gray scale representation.

When the gray scale levels of the input signal are changed from the gray scale levels (205, 205, 0) to the gray scale levels (255, 255, 0), the luminance level of each of the red and green sub pixels is increased in the display device 100. When the gray scale levels of the input signal are (255, 255, 0), the luminance levels of the red, green, blue and yellow sub pixels in the display device 100 are (1, 0.6, 0, 1). These correspond to the gray scale levels (255, 202, 0, 255) in the 255 gray scale level representation.

Next, when the gray scale levels of the input signal are changed from the gray scale levels (255, 255, 0) to the gray scale levels corresponding to white (255, 255, 255), the luminance level of the green sub pixel is further increased and the luminance level of the blue sub pixel is increased in the display device 100.

In this manner, in the display device 100, as the color represented by the input signal is changed, first, the luminance level of each of the yellow and red sub pixels is increased. On this stage, the luminance level of the red sub pixel is increased at a lower rate than that of the luminance level of the yellow sub pixel. After the luminance level of the yellow sub pixel reaches the maximum luminance level, the luminance level of the red sub pixel is further increased and the luminance level of the green sub pixel is started to be increased. After the luminance level of the red sub pixel reaches the maximum luminance level, the luminance level of the green sub pixel is further increased and the luminance level of the blue sub pixel is started to be increased.

Figure 23:
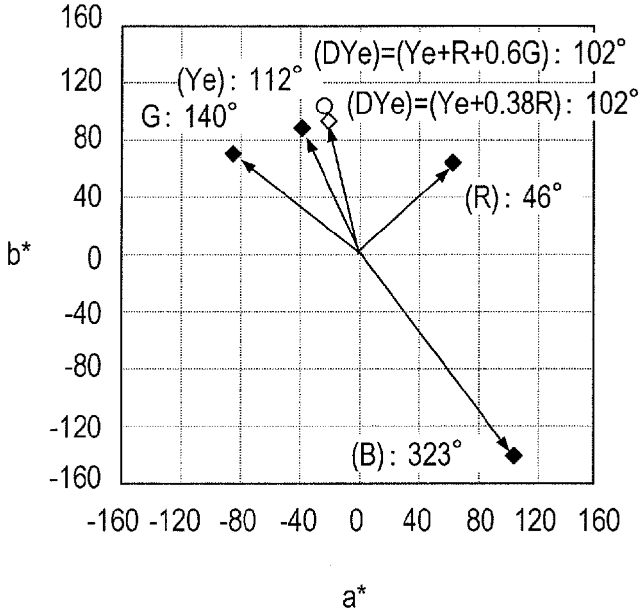
FIG. 23 is a chromaticity diagram of the L*a*b* colorimetric system obtained by plotting a* and b* in the multiple primary color display device in Embodiment 2 when the input signal represents red, green, blue or yellow.

FIG. 23 is a chromaticity diagram of the L*a*b* colorimetric system obtained by plotting a* and b* in the display device 100 when the gray scale levels of red, green and blue of the input signal are (255, 0, 0), (0, 255, 0), (0, 0, 255) or (255, 255, 0).

Like in the case described above, when the gray scale levels of red, green and blue of the input signal are (255, 0, 0), (0, 255, 0) or (0, 0, 255), one of the red, green and blue sub pixels is lit in the display device 100, and the hue angles of the hues of the red, green and blue sub pixels, namely, (R), (G) and (B) are respectively 46°, 140° and 323°. When the gray scale levels of red, green and blue of the input signal are (205, 205, 0), the yellow and red sub pixels are lit in the display device 100. However, the luminance level of the red sub pixel is lower than the luminance level of the yellow sub pixel. The luminance level of the red sub pixel is 0.38 times the luminance level of the yellow sub pixel. In this case, the hue angle of this hue (DYe=Ye+0.38R) is 102°. When the gray scale levels of red, green and blue of the input signal are (255, 255, 0), the yellow, red and green sub pixels are lit in the display device 100. However, the luminance level of the green sub pixel is lower than the luminance level of each of the yellow and red sub pixels. The luminance level of the green sub pixel is 0.6 times the luminance level of each of the yellow and red sub pixels. In this case, the hue angle of this hue (DYe=Ye+R+0.6G) is 102°.

Figure 24:
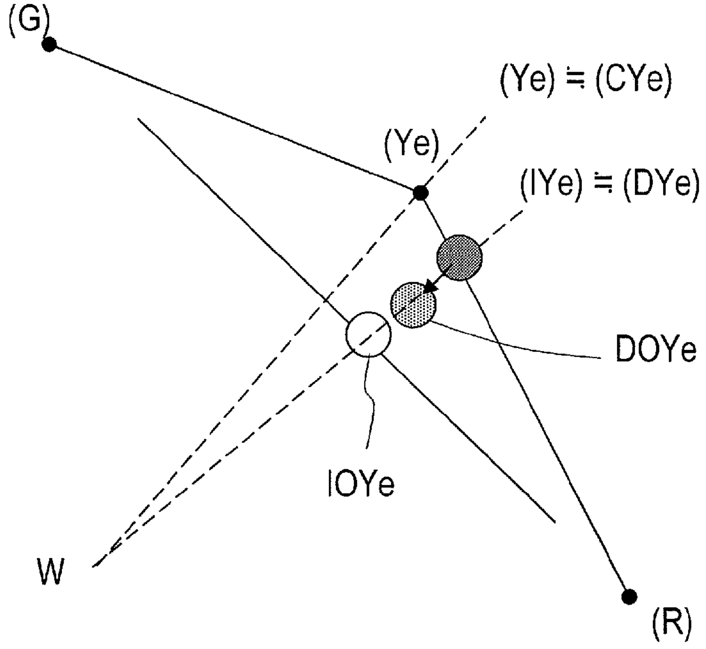
FIG. 24 is a partially enlarged view of an xy chromaticity diagram showing a difference between yellow of the input signal and yellow of the multiple primary color display device in Embodiment 2.

FIG. 24 is a partially enlarged view of an xy chromaticity diagram schematically showing the hue (IYe) of yellow of the input signal and the hue (DYe) of yellow in the display device 100. In FIG. 24 also, chromaticity IOYe is the chromaticity of a three primary color display device when the gray scale levels of red, green and blue of the input signal are (255, 255, 0). Chromaticity COYe is the chromaticity of the display device 400B when the gray scale levels of red, green and blue of the input signal are (255, 255, 0). Chromaticity DOYe is the chromaticity of the display device 100 when the gray scale levels of red, green and blue of the input signal are (255, 255, 0). As described above, the hue (Ye) of the yellow sub pixel is on the side of the hue (G) of the green sub pixel with respect to the hue (IYe) of yellow of the input signal.

In the display device 100, the luminance level of the red sub pixel is increased together with the luminance level of the yellow sub pixel. As a result, the hue (DYe) of yellow in the display device 100 is shifted more toward the hue (R) of the red sub pixel than toward the hue (CYe) of yellow in the display device 400B. Therefore, the hue (DYe) of yellow in the display device 100 can approximately match the hue (IYe) of yellow of the input signal. Thus, the decrease of the display quality can be suppressed.

Figure 25:
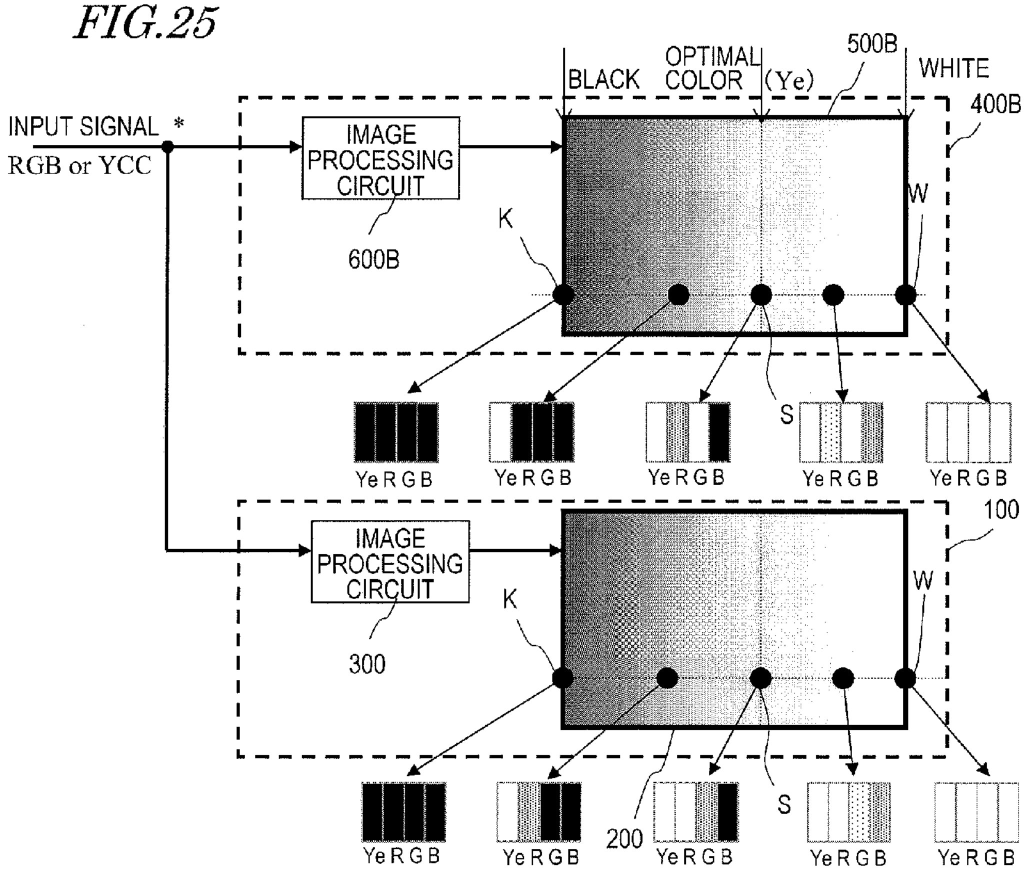
FIG. 25 is a schematic view showing a difference between the multiple primary color display device in Embodiment 2 and the multiple primary color display device in Comparative Example 2.
Figure 26:
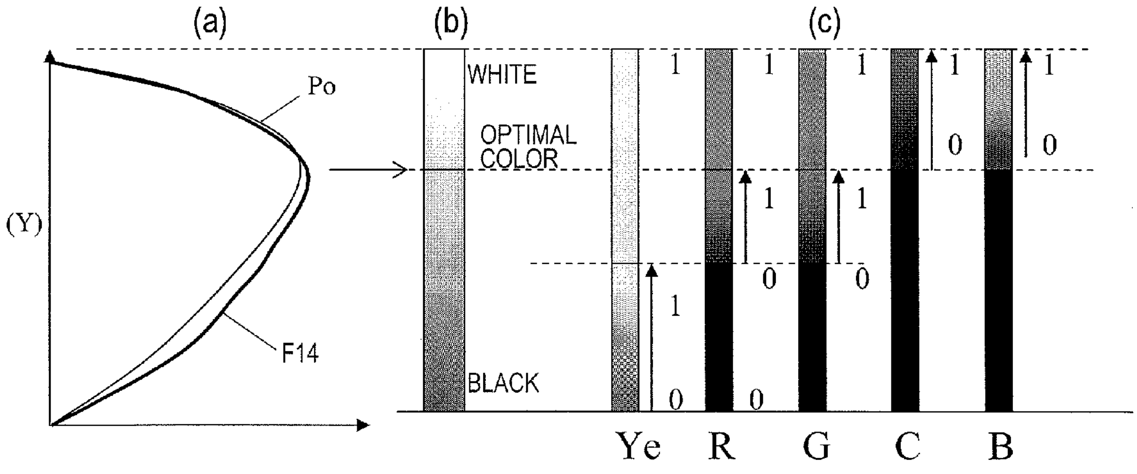
FIG. 26 Prior Art
FIG. 26(*a*) is a color tone diagram showing a color reproduction range of a pixel in a conventional multiple primary color display device.

FIG. 25 is a schematic view showing a difference between the display device 100 in this embodiment and the display device 400B in Comparative Example 2.

The same input signal is input into both of the display device 100 in this embodiment and the display device 400B in Comparative Example 2. This input signal allows the entirety of the multiple primary color panel 200 and the entirety of the multiple primary color panel 500B to provide gradation display which is changed from black to white via yellow. By use of such an input signal, it can be easily found whether the multiple primary color display device is the display device 100 in this embodiment or not.

In the multiple primary color panel 200, the yellow, red, green and blue sub pixels each have a strip-like shape. In this example, the yellow, red, green and blue sub pixels are arranged in stripes in this order. Similarly in the multiple primary color panel 500B, the yellow, red, green and blue sub pixels each have a strip-like shape, and are arranged in stripes in this order.

In the display device 400B in Comparative Example 2, part K of the multiple primary color panel 500B displays black. In part K, all the sub pixels have a luminance level of "0". Part S of the multiple primary color panel 500B displays an optimal color of yellow. In part S, the luminance levels of the yellow, red, green and blue sub pixels are (1, 0.72, 1, 0). Part W of the multiple primary color panel 500B displays white. In part W, all the sub pixels have a luminance level of "1". In the multiple primary color panel 500B, as progressing from the part K toward part S, first, the luminance level of the yellow sub pixel is increased. When the luminance level of the yellow sub pixel reaches the maximum luminance level, the luminance level of each of the green and red sub pixels is increased. As a result, the lightness of the pixel is risen. In the multiple primary color panel 500B, as progressing from the part S toward part W, the luminance level of each of the red and blue sub pixels is increased. As a result, the lightness of the pixel is risen.

Meanwhile, in the display device 100, part K of the multiple primary color panel 200 displays black. Therefore, in part K, all the sub pixels have a luminance level of "0". Part S of the multiple primary color panel 200 displays an optimal color of yellow. In part S, the yellow and red sub pixels each have a luminance level of "1", whereas the green sub pixel has a luminance level of lower than "1". For example, the luminance level of the green sub pixel is "0.6". The luminance level of the blue sub pixel is "0". Part W of the multiple primary color panel 200 displays white. In part W, all the sub pixels have a luminance level of "1". In the multiple primary color panel 200, as progressing from the part K toward part S, first, the luminance level of each of the yellow and red sub pixels is increased. When the luminance level of the yellow sub pixel reaches the maximum level, the luminance of each of the red and green sub pixels is increased. As a result, the lightness of the pixel is risen. In the multiple primary color panel 200, as progressing from the part S toward part W, the luminance level of each of the green and blue sub pixels is increased. As a result, the lightness of the pixel is risen. The luminance level of each of these sub pixels can be checked by observing a pixel of the multiple primary color panel 200 and a pixel of the multiple primary color panel 500B, which provide gradation display, in the state of being enlarged by use of a loupe or the like.

In the above description, the hue (IYe) of yellow of the input signal is positioned between the hue (Ye) of the yellow sub pixel and the hue (R) of the red sub pixel in the display device 100. However, the present invention is not limited to this. The hue (IYe) of yellow of the input signal may be positioned between the hue (Ye) of the yellow sub pixel and the hue (G) of the green sub pixel in the display device 100.

In this case also, when the color represented by the input signal is changed from black to white via yellow, the luminance level of the green sub pixels is started to be increased together with the luminance level of the yellow sub pixel without increasing the luminance level of each of the red and blue sub pixels in the display device 100. On this stage, the luminance level of the green sub pixel is increased at a lower rate than that of the luminance level of the yellow sub pixel. As a result, the decrease of the display quality can be suppressed.

In the above description, the hue of the input signal corresponding to the gray scale levels of red, green and blue of (255, 255, 0) (i.e., the hue (IYe)) is different from any of the hues of the red, green, blue and yellow sub pixels in the display device 100, i.e., (R), (G), (B) and (Ye), the luminance level of each of the yellow and red sub pixels is started to be increased. When, for example, the hue of the input signal corresponding to gray scale levels different from the gray scale levels of green and blue of (255, 255, 0) is approximately equal to the hue (Ye) of the yellow sub pixel in the display device 100, the luminance level of only the yellow sub pixel may be started to be increased. When, for example, the color represented by the input signal is changed from black to black via yellow of a hue (Ye) of the yellow sub pixel in the display device 100, the luminance levels of the sub pixels in the display device 100 may be changed as shown in FIG. 18(*b*).

In the above description, each of the pixels in the display device 100 includes the red, green, blue and yellow sub pixels, but the present invention is not limited to this. Each pixel may include red, green, blue and cyan sub pixels.

In the following description, it is assumed that the gray scale levels of green and blue of the input signal are increased to the maximum gray scale level at an equal rate to each other and then the gray scale level of red is increased to the maximum gray scale level, so that the color is changed from black to white via cyan. The hue of this cyan is represented as "(IC)". The hue (IC) of cyan of the input signal is closest to, but different from, the hue of the cyan sub pixel among the red, green, blue and cyan sub pixels in the display device 100.

In the case where the hue (IC) of cyan of the input signal is between the hue of the cyan sub pixel and the hue of the green sub pixel in the display device 100, when the color represented by the input signal is changed from black to white via cyan, the luminance level of the green sub pixel is started to be increased together with the luminance level of the cyan sub pixel without increasing the luminance level of each of the red and blue sub pixels in the display device 100. On this stage, the luminance level of the green sub pixel is increased at a lower rate than that of the luminance level of the cyan sub pixel. As a result, the decrease of the display quality can be suppressed.

Alternatively, in the case where the hue (IC) of cyan of the input signal is between the hue of the cyan sub pixel and the hue of the blue sub pixel in the display device 100, when the color represented by the input signal is changed from black to white via cyan, the luminance level of the blue sub pixel is started to be increased together with the luminance level of the cyan sub pixel without increasing the luminance level of each of the red and green sub pixels in the display device 100. On this stage, the luminance level of the blue sub pixel is increased at a lower rate than that of the luminance level of the cyan sub pixel. As a result, the decrease of the display quality can be suppressed.

Alternatively, each pixel in the display device 100 may include red, green, blue and magenta sub pixels.

In the following description, it is assumed that the gray scale levels of red and blue of the input signal are increased to the maximum gray scale level at an equal rate to each other and then the gray scale level of green is increased to the maximum gray scale level, so that the color is changed from black to white via magenta. The hue of this magenta is represented as "(IM)". The hue (IM) of magenta of the input signal is closest to, but different from, the hue of the magenta sub pixel among the red, green, blue and magenta sub pixels in the display device 100.

In the case where the hue (IM) of magenta of the input signal is between the hue of the magenta sub pixel and the hue of the red sub pixel in the display device 100, when the color represented by the input signal is changed from black to white via magenta, the luminance level of the red sub pixel is started to be increased together with the luminance level of the magenta sub pixel without increasing the luminance level of each of the green and blue sub pixels in the display device 100. On this stage, the luminance level of the red sub pixel is increased at a lower rate than that of the luminance level of the magenta sub pixel. As a result, the decrease of the display quality can be suppressed.

Alternatively, in the case where the hue (IM) of magenta of the input signal is between the hue of the magenta sub pixel and the hue of the blue sub pixel in the display device 100, when the color represented by the input signal is changed from black to white via magenta, the luminance level of the blue sub pixel is started to be increased together with the luminance level of the magenta sub pixel without increasing the luminance level of each of the red and green sub pixels in the display device 100. On this stage, the luminance level of the blue sub pixel is increased at a lower rate than that of the luminance level of the magenta sub pixel. As a result, the decrease of the display quality can be suppressed.

In the display device 100 in each of Embodiment 1 and Embodiment 2 described above, each of the pixels includes a plurality of sub pixels, but the present invention is not limited to this.

The display device 100 may be driven by a field sequential method. According to the field sequential method, one frame includes a plurality of sub frames each corresponding to each primary color, and thus color display is provided. The luminance levels (gray scale levels) in the sub frames each corresponding to each primary color are set so as to correspond to the combination of the luminance levels of the sub pixels shown in FIG. 5(*b*), FIG. 16(*b*) or the like. In this manner, substantially the same effects as those described above can be provided. In this case, the multiple primary color panel 200 includes four light sources having different light emission wavelengths, and the light sources are lit sequentially in one field. The light sources may be fluorescent tubes or LEDs.

In the display device 100 in each of Embodiment 1 and Embodiment 2 described above, a liquid crystal panel is used as the multiple primary color panel, but the present invention is not limited to this. The multiple primary color panel may be any display device capable of providing multiple color display such as a CRT, a plasma display panel (PDP), an SED display panel, a liquid crystal projector or the like.

The elements included in the image processing circuit 300 of the display device 100 in each of Embodiment 1 and Embodiment 2 described above are realized by hardware, or a part thereof or the entirety thereof may be realized by software. When these elements are realized by software, a computer may be used. Such a computer includes a CPU (Central Processing Unit) for executing various programs, a RAM (Random Access Memory) acting as a work area for executing such programs, and the like. A program for realizing the functions of the elements is executed by the computer, and the computer is operated as the elements.

The program may be provided to the computer from a storage medium, or may be provided to the computer via a communication network. The storage medium may be structured to be separable from the computer or incorporated into the computer. The storage medium may be mounted on the computer such that a program code stored thereon can be directly read by the computer, or may be mounted on the computer as an external storage device such that the program can be read via a program read device connected to the computer. The storage device may be, for example, a tape such as a magnetic tape, a cassette tape or the like; a disc such as a magnetic disc, for example, a flexible disc, a hard disc or the like, a magneto-optical disc, for example, an MO, an MD or the like, or an optical disc, for example, a CD-ROM, a DVD, a CD-R or the like; a card such as an IC card (including a memory card), an optical card or the like; or a semiconductor memory such as a mask ROM, an EPROM (Erasable Programmable Read Only Memory), EEPROM (Electrically Erasable Programmable Read Only Memory), a flash ROM or the like. In the case where the program is provided via a communication network, the program is in the form of a carrier wave or a data signal which embodies the program code by electronic transfer.

INDUSTRIAL APPLICABILITY

A multiple primary color display device according to the present invention is preferably usable for, for example, a monitor of a personal computer, a liquid crystal TV, a liquid crystal projector, a display panel of a mobile phone or the like.

REFERENCE SIGNS LIST

100 Multiple primary color display device
200 Multiple primary color panel
300 Image processing circuit

The invention claimed is:

1. A multiple primary color display device comprising a pixel defined by a plurality of sub pixels, wherein:

the plurality of sub pixels include a first sub pixel to display a first color having a first hue, a second sub pixel to display a second color having a second hue, a third sub pixel to display a third color having a third hue, and a fourth sub pixel to display a fourth color having a fourth hue;

in the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues of the plurality of sub pixels, the second hue is closest to the prescribed hue on an opposite side to the first hue with respect to the prescribed hue, and the third hue is closest to the prescribed hue next to the first hue on the same side as the first hue with respect to the prescribed hue; luminance levels of the plurality of sub pixels are set such that the luminance level of each of the first sub pixel, the second sub pixel and the third sub pixel is started to be increased without increasing the luminance level of the fourth sub pixel and such that the luminance level of the third sub pixel is increased at a lower rate than that of the luminance level of each of the first sub pixel and the second sub pixel.

2. The multiple primary color display device of claim 1, wherein when the color represented by the input signal is changed from black to white via the color of the prescribed hue, the luminance levels of the plurality of sub pixels are set such that after the luminance level of each of the first sub pixel and the second sub pixel reaches a maximum luminance level, the luminance level of the fourth sub pixel is started to be increased.

3. A multiple primary color display device comprising a pixel defined by a plurality of sub pixels, wherein:

the plurality of sub pixels include a first sub pixel to display a first color having a first hue, a second sub pixel to display a second color having a second hue, a third sub pixel to display a third color having a third hue, and a fourth sub pixel to display a fourth color having a fourth hue;

in the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues of the plurality of sub pixels, and the second hue is closest to the prescribed hue on an opposite side to the first hue with respect to the prescribed hue; luminance levels of the plurality of sub pixels are set such that the luminance level of each of the first sub pixel and the second sub pixel is started to be increased without increasing the luminance level of each of the third sub pixel and the fourth sub pixel and such that the luminance level of the second sub pixel is increased at a lower rate than that of the luminance level of the first sub pixel.

4. The multiple primary color display device of claim 3, wherein when the color represented by the input signal is changed from black to white via the color of the prescribed hue, the luminance levels of the plurality of sub pixels are set such that after the luminance level of the first sub pixel reaches a maximum luminance level, the luminance level of the third sub pixel is started to be increased.

5. The multiple primary color display device of claim 3, wherein when the color represented by the input signal is changed from black to white via the color of the prescribed hue, the luminance levels of the plurality of sub pixels are set such that after the luminance level of the second sub pixel reaches a maximum luminance level, the luminance level of the fourth sub pixel is started to be increased.

6. The multiple primary color display device of claim 1, wherein:

each of the first, second, third and fourth colors are any of red, green, blue and yellow; and when the first color is yellow, the second and third colors are red and green.

7. A multiple primary color display device comprising a pixel, wherein:

the pixel is capable of displaying a first color having a first hue, a second color having a second hue, a third color having a third hue, and a fourth color having a fourth hue at any luminance with any combination; and in the case where gray scale levels of two colors among three colors of red, green and blue of an input signal are increased to a maximum gray scale level and then a gray scale level of the remaining color is increased to the maximum gray scale level, so that a color represented by the input signal is changed from black to white via a color of a prescribed hue; where the prescribed hue is different from any of the first hue, the second hue, the third hue and the fourth hue; and where in a chromaticity diagram of an L*a*b* colorimetric system, the prescribed hue is closest to the first hue among the hues displayable by the pixel, the second hue is closest to the prescribed hue on an opposite side to the first hue with respect to the prescribed hue, and the third hue is closest to the prescribed hue next to the first hue on the same side as the first hue with respect to the prescribed hue; luminance levels of the colors displayable by the pixel are set such that the luminance level of each of the first color, the second color and the third color is started to be increased without increasing the luminance level of the fourth color and such that the luminance level of the third color is increased at a lower rate than that of the luminance level of each of the first color and the second color.

8. A multiple primary color display device comprising a pixel, wherein:

the pixel is capable of displaying a first color having a first hue, a second color having a second hue, a third color having a third hue, and a fourth color having a fourth hue at any luminance with any combination; and in the case where gray scale levels of two colors among three colors of red, green and blue of an input signal are increased at an equal rate to one another to a maximum gray scale level and then a gray scale level of the remaining color is increased to the maximum gray scale level, so that a color represented by the input signal is changed from black to white via a color of a prescribed hue;

where the prescribed hue is different from any of the first hue, the second hue, the third hue and the fourth hue; and where in a chromaticity diagram of an L*a*b* colorimetric system, the prescribed hue is closest to the first hue among the hues displayable by the pixel, and the second hue is closest to the prescribed hue on an opposite side to the first hue with respect to the prescribed hue; luminance levels of the colors displayable by the pixel are set such that the luminance level of each of the first color and the second color is started to be increased without increasing the luminance level of each of the third color and the fourth color and such that the luminance level of the second color is increased at a lower rate than that of the luminance level of the first color.

* * * * *